(12) United States Patent
Uno et al.

(10) Patent No.: US 7,204,667 B2
(45) Date of Patent: Apr. 17, 2007

(54) HIGH STRENGTH BOLTED STRUCTURE AND METHOD OF SECURING NUT AND TORQUE-SHEAR TYPE HIGH STRENGTH BOLT AND JOINING METHOD USING SAME

(75) Inventors: Nobuyoshi Uno, Futtsu (JP); Masahiro Nagata, Tokyo (JP); Hidetoshi Tamasaki, Yukuhashi (JP); Seiichi Kanazawa, Yukuhashi (JP); Kiyoshi Hatanaka, Yukuhashi (JP); Toshio Miyagawa, Yukuhashi (JP)

(73) Assignees: Nippon Steel Corporation, Tokyo (JP); Nippon Steel Bolten Co., Ltd., Fukuoka (JP)

( * ) Notice: Subject to any disclaimer, the term of this patent is extended or adjusted under 35 U.S.C. 154(b) by 0 days.

(21) Appl. No.: 10/204,206

(22) PCT Filed: Dec. 18, 2001

(86) PCT No.: PCT/JP01/11108

§ 371 (c)(1),
(2), (4) Date: Aug. 16, 2002

(87) PCT Pub. No.: WO02/50439

PCT Pub. Date: Jun. 27, 2002

(65) Prior Publication Data

US 2003/0021652 A1    Jan. 30, 2003

(30) Foreign Application Priority Data

Dec. 18, 2000  (JP) .............................. 2000-383371
Mar. 8, 2001    (JP) .............................. 2001-064262

(51) Int. Cl.
*F16B 21/00*    (2006.01)
*F16B 31/00*    (2006.01)

(52) U.S. Cl. .............................. 411/338; 411/4; 411/5; 411/432; 411/533

(58) Field of Classification Search ................ 411/4, 411/5, 34, 338, 405, 339, 361, 432, 533, 549, 411/999; 29/525.02, 525.11
See application file for complete search history.

(56) References Cited

U.S. PATENT DOCUMENTS 287,390 A * 10/1883 Reese ...................... 411/125

(Continued)

FOREIGN PATENT DOCUMENTS

JP    38-10833    6/1963

(Continued)

*Primary Examiner*—Brian E. Glessner
*Assistant Examiner*—Carlos Lugo
(74) *Attorney, Agent, or Firm*—Kenyon & Kenyon LLP

(57) ABSTRACT

A join structure comprises a box section column and spit T-section joined by a high strength bolt and a method secures a nut to an inside of the box section column. A Torque-Shear type high strength bolt is tightly tightened by a controlled tension and a joining method of a steel member uses that bolt. The join structure is comprised of a box section column, a split T-section attached to its outer surface, and a high strength bolt inserted from the outside of the split T-section and fastened with the nut. The nut is secured to the box section column by joining a sleeve secured to a washer formed integrally with the nut and a sleeve of a nut holding part from the outside of the column. The Torque-Shear type high strength bolt has a pintail for controlling the torque at its top.

10 Claims, 25 Drawing Sheets

U.S. PATENT DOCUMENTS

| | | | | |
|---|---|---|---|---|
| 314,888 | A * | 3/1885 | Smith | 411/126 |
| 788,718 | A * | 5/1905 | Hawkins | 411/127 |
| 2,078,411 | A * | 4/1937 | Richardson | 411/113 |
| 2,240,425 | A * | 4/1941 | Sternbergh | 411/433 |
| 3,126,039 | A * | 3/1964 | Fiddler | 411/112 |
| 3,138,987 | A * | 6/1964 | Wing | 411/4 |
| 3,298,270 | A * | 1/1967 | Pierre | 411/542 |
| 3,298,725 | A * | 1/1967 | Boteler | 403/282 |
| 3,386,771 | A * | 6/1968 | Henri | 301/35.625 |
| 4,289,060 | A * | 9/1981 | Emmett | 411/34 |
| 4,289,061 | A * | 9/1981 | Emmett | 411/34 |
| 4,376,604 | A * | 3/1983 | Pratt et al. | 411/34 |
| 4,481,702 | A * | 11/1984 | Mitchell | 29/432 |
| 4,565,112 | A * | 1/1986 | Fujita et al. | 81/56 |
| 4,637,764 | A * | 1/1987 | Imai | 411/5 |
| 4,659,267 | A * | 4/1987 | Uno et al. | 411/5 |
| 4,784,551 | A * | 11/1988 | Kendall | 411/43 |
| 4,850,771 | A * | 7/1989 | Hurd | 411/43 |
| 4,934,887 | A * | 6/1990 | Sharp et al. | 411/339 |
| 4,979,857 | A * | 12/1990 | Wing | 411/5 |
| 5,018,920 | A * | 5/1991 | Speakman | 411/43 |
| 5,051,049 | A * | 9/1991 | Wills | 411/258 |
| 5,096,349 | A * | 3/1992 | Landy et al. | 411/108 |
| 5,108,238 | A * | 4/1992 | Ewing | 411/5 |
| 5,253,962 | A * | 10/1993 | Close, Jr. | 411/34 |
| 5,259,714 | A * | 11/1993 | Campbell | 411/34 |
| 5,405,228 | A * | 4/1995 | Reid et al. | 411/183 |
| 5,464,311 | A * | 11/1995 | Hiraguri et al. | 411/340 |
| 5,603,592 | A * | 2/1997 | Sadri et al. | 411/34 |
| 5,613,818 | A * | 3/1997 | McCorkle et al. | 411/509 |
| 5,651,649 | A * | 7/1997 | Sadri et al. | 411/34 |
| 5,860,778 | A * | 1/1999 | Keener | 411/5 |
| 6,053,680 | A * | 4/2000 | Menke | 411/178 |
| 6,146,070 | A * | 11/2000 | Koma | 411/5 |
| 6,254,323 | B1 * | 7/2001 | Junkers | 411/14.5 |

FOREIGN PATENT DOCUMENTS

| | | |
|---|---|---|
| JP | 55-149410 | 11/1980 |
| JP | 61-167710 | 7/1986 |
| JP | 61-198713 | 12/1986 |
| JP | 63-78718 | 5/1988 |
| JP | 4-11907 | 1/1992 |
| JP | 6-33929 | 2/1994 |
| JP | 6-18721 | 3/1994 |
| JP | 6-101284 | 4/1994 |
| JP | 7-145638 | 6/1995 |
| JP | JU-7-38733 | 7/1995 |
| JP | 8-193609 | 7/1996 |
| JP | 10-338824 | 12/1998 |
| JP | 11-257326 | 9/1999 |
| JP | 2000-27315 | 1/2000 |
| JP | 2000-213070 | 8/2000 |
| JP | 2000-220622 | 8/2000 |
| JP | 2002-5145 | 1/2002 |
| WO | WO 90/07653 | 7/1990 |

* cited by examiner

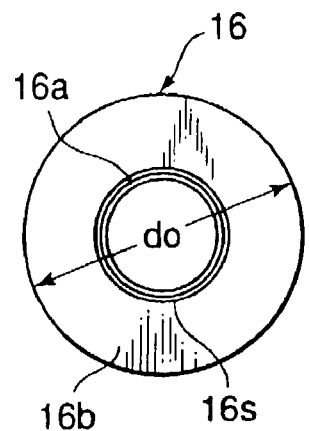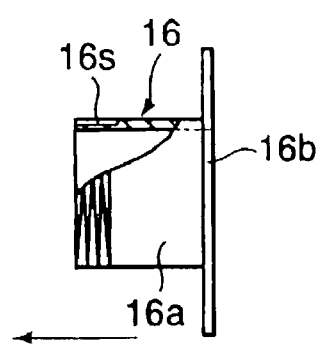
Fig.3(a) Fig.3(b)
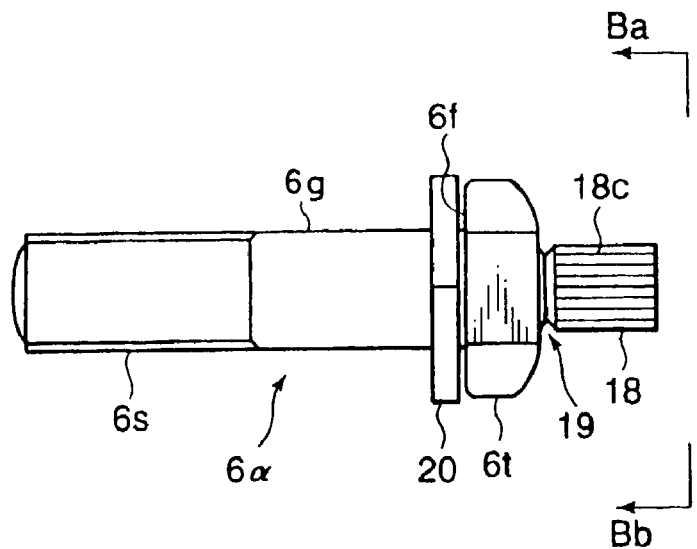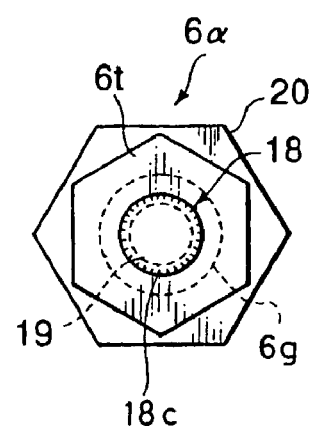
Fig.4(a) Fig.4(b)

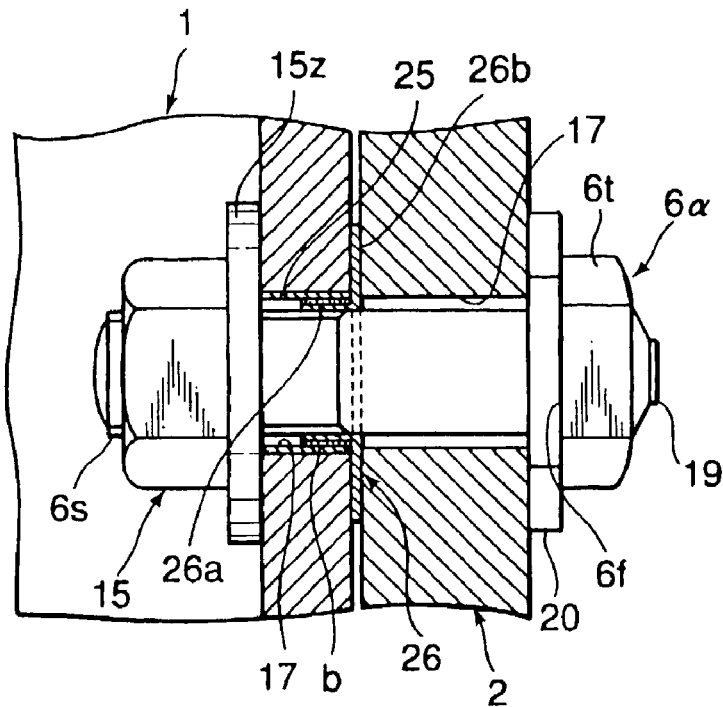
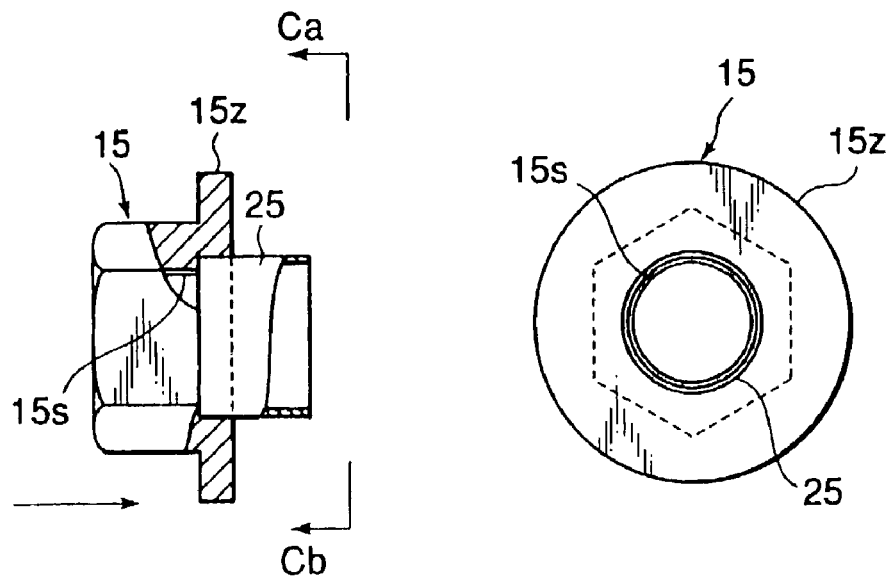

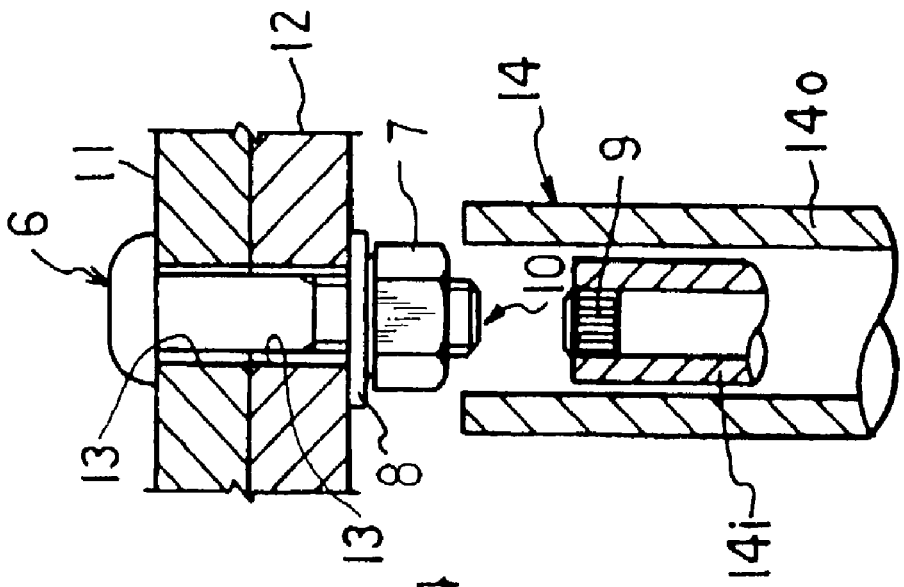
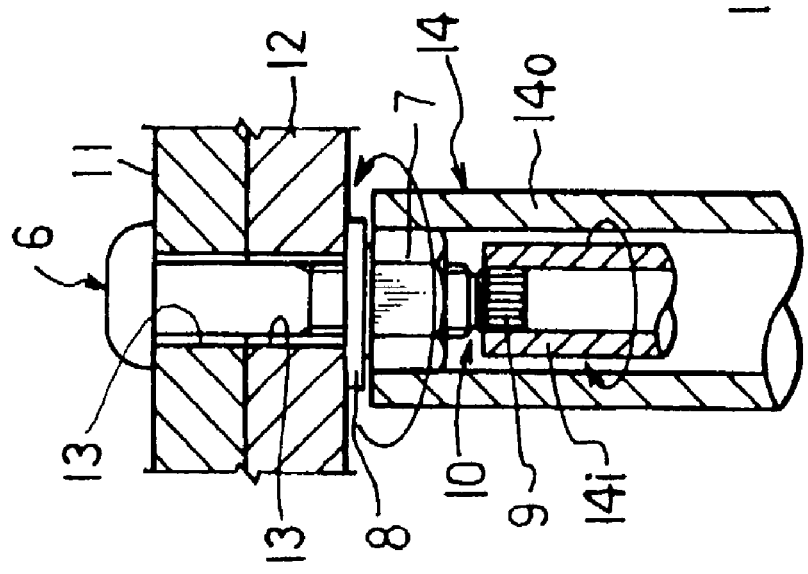
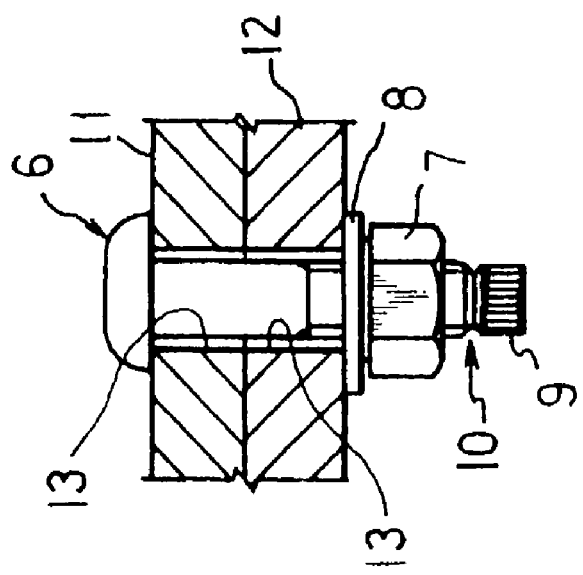

HIGH STRENGTH BOLTED STRUCTURE AND METHOD OF SECURING NUT AND TORQUE-SHEAR TYPE HIGH STRENGTH BOLT AND JOINING METHOD USING SAME

TECHNICAL FIELD

The present invention relates to a high strength bolted structure and method of securing a nut, and to a Torque-Shear type high strength bolt and joining method using this bolt, as used in a bolted structure between a box section column and an H-section beam when constructing a steel structure building using rectangular steel tubes or box section members having rectangular sections or circular sections such as steel tubes as the columns and attaching the H-section beams (rolled members or welded members) to the box section columns through split T-sections, end plates, angles, fish plates, or other joining hardware.

BACKGROUND ART

In recent years, much use has been made of bidirectional "Rahmen" frame structures using rectangular steel tubes having hollow rectangular cross-sections (including those obtained by welding together plates or shapes) and other rectangular box section members and H-section steel (including those obtained by welding together plates or shapes) and other H-section beams. As the join structure, through-type diaphragm type join structures are generally used. In this type of join structure, the box section columns and diaphragms are joined and the diaphragms and H-section beams are joined by welding. The attachment parts and H-section beams have been joined by bolting through fish plates.

In such a through diaphragm type join structure, the compressive force and tension at the upper and lower flanges occurring when a bending moment acts on the H-section beam can be transmitted to the box section column without causing a reduction in the rigidity of the join, but the structure is complicated and the number of processing steps becomes huge. Further, the two surfaces of the diaphragm have to be welded to the box section column and column core, the amount of welding becomes great, and sophisticated welding skills become necessary.

Therefore, recently, as shown in FIG. 37, a join structure lightening the welding load by joining split T-sections 2 to a box section column 1 without using a diaphragm by special structure expensive one-side bolts 3 (not shown in detail) and joining H-section beams 4 to the split T-sections 2 by high strength bolts 5 has become adopted. As the high strength bolts 5 used here, much use is made of sets of the structural "Torque-Shear" type high strength bolts, hexagonal nuts, and flat washers as defined in the standards (JSS II 09 1996) of the Japan Society of Steel Construction (hereinafter referred to as "Torque-Shear type high strength bolts").

These Torque-Shear type high strength bolts are provided with structures enabling introduction of a predetermined tension to the bolts and are structured as shown in FIG. 38(a) to FIG. 38(c). That is, the Torque-Shear type high strength bolts 6 have heads with circular outer circumferential shapes and form pintails 9 for torque control through breaknecks 10 at the front ends of the male threads to be screwed into the female threads of nuts 7 having hexagonal outer circumferential shapes.

When using such Torque-Shear type high strength bolts 6 to bolt together steel members, as shown in FIG. 39(a), the Torque-Shear type high strength bolts 6 are inserted into bolt holes 13 of the steel members 11 and 12 to be joined, nuts 7 are screwed on the projecting male threads through washers 8, then the nut 7 sides are rotated for tightening. At the time of this tightening, a special tightening tool 14 such as shown in FIG. 39(b) is used.

This tightening tool 14 is provided with a mechanism for operating in association an outer sleeve 14o for engaging with a nut 7 and an inner sleeve 14i for gripping the pintail 9 and giving a predetermined torque. When using this tightening tool 14 to tighten a Torque-Shear type high strength bolt 6, one grips the pintail 9 by the inner sleeve 14i and rotates the nut 7 by the outer sleeve 14o so as to transmit the rotational torque of the nut to the breakneck 10 of the pintail 9 as a reaction force and, as shown in FIG. 39(c), break that portion by a certain constant torque. It is possible to control the tension introduced to the high strength bolt by the breaking torque at this time.

This Torque-Shear type high strength bolt is used when bolting a split T-section to a box section column, when bolting an H-section beam to a split T-section directly or through a fish plate, etc. in a bolted structure of a rectangular box section member and H-section beam and is designed to be tightened by screwing with a nut with the pintail forming side at the outside of the join portion.

In general, a nut usually has a height of substantially the same dimension as the shaft diameter and, in the state finished being tightened, leaves the front end of the male thread of the high strength bolt projecting outside by about an extent of three threads. Further, it is necessary to interpose a washer. Therefore, in the case of a high strength bolt having a shaft diameter of 22 mm, the dimension from the surface of the washer to the breaking plane of the breakneck of the pintail becomes about 35 mm and the assembly projects largely from the outer surface of the steel member or joining hardware. Such a large projection obstructs application of fire-resistant coverings and finishing work. Further, in the case of naked frames, it impair the aesthetic appearance and therefore is not preferable in terms of design either.

Further, in such a join structure of a box section column and split T-section, the bolting work is impossible with usual bolting using a general high strength bolt (for example, high strength hexagonal bolt for friction grip joins as defined in JIS B1186, structural use Torque-Shear type high strength bolts of the standards of the Japan Society of Steel Construction, etc.)

Therefore, a one-side bolt enabling joining work from the outer side of a box section column has been developed and commercialized. Further, a method of inserting a general high strength bolt into a bolt hole provided in a box section column by a special tool from the inside of the box section column in the factory or on the site in advance and attaching and securing split T-sections to the box section column before constructing the columns has been proposed.

A join structure using the former one-side bolts however is expensive and therefore the cost of the joins skyrockets. Further, there are limits to the strength. In addition, control of the tension introduced to the bolts is not easy. It was therefore not possible to realize a stable bolted structure in a column-beam structure in a large-sized structure.

Further, the latter method improved the cost aspects and strength compared with a one-side bolt, but since the upper and lower split T-sections were secured to the columns before attaching the beams, there were limits to the method of attachment of the beams on the site, there was the problem of a drop in the work speed, and in the end a rise in the construction costs.

Therefore, another method has been employed of attaching only the lower split T-sections for attaching the lower flanges of H-section beams at the factory and securing the nuts to the inner side of the box section columns in advance at the factory so that the upper split T-sections may be attached at the site by inserting bolts from the outside when attaching the H-section beams, and, when attaching the H-section beams, attaching the upper split T-sections to the upper flanges of the H-section beams, supporting the H-section beams by the lower split T-sections, and in that state aligning and attaching the upper split T-sections to the box section columns.

For example, Japanese Unexamined Patent Publication (Kokai) No. 6-33929, Japanese Unexamined Patent Publication (Kokai) No. 6-101284, and Japanese Unexamined Patent Publication No. 7-145638 disclose to secure a nut to the inner side of a rectangular steel tube and insert and tighten a bolt from the outer side. In such a bolted structure, however, the nut has to be formed integrally with a collar and the collar has to be deformed to be pushed into the bolt hole from the inner side of the rectangular steel tube, so it was necessary to give a large force at the inner side of a narrow rectangular steel tube and the work was difficult. Further, in practice it was not possible to use the above conventional Torque-Shear type high strength bolt, not possible to simply introduce tension to the bolts, and difficult to realize a stable bolted structure.

The present invention has as its object to solve the problems in a conventional high strength bolted structure and for example to provide a high strength bolted structure of a column made of a box section member and a split T-section used as joining hardware wherein a nut is secured to an inner side of the box section member, a high strength bolt is inserted from an outer side, and control of the introduction of tension to the high strength bolt is easy and a method of securing a nut to an inside of a box section column and to provide a Torque-Shear type high strength bolt having a structure for being tightened by rotating a head side of the bolt, enabling introduction of a tension to the bolt at the bolt head side, and enabling a reduction of the height of the projection due to the head and washer at the outer side and a bolting method using that bolt.

DISCLOSURE OF THE INVENTION

The present invention has as its gist the following (1) to (20) to achieve the above object:

(1) A high strength bolted structure of a box section member and joining hardware characterized in that at least at a plurality of locations of high strength bolted locations of a box section member and joining hardware, a female thread end of a nut abutting against an inner side of the box section member is separately provided with a female thread of a larger diameter than the diameter of that female thread, a male thread of a sleeve of a nut holding part inserted into a bolt hole from an outer side is screwed into it, whereby the nut is secured to the inner side of the box section member, a high strength bolt is inserted into the bolt hole from the outer side of joining hardware abutting against the outside of the box section member, and a male thread is screwed with the nut secured to the inner side of the box section member.

(2) A high strength bolted structure of a box section member and joining hardware characterized in that at least at a plurality of locations of high strength bolted locations of a box section member and joining hardware, a sleeve is fixed to a nut arranged at an inner side of the box section member, the sleeve is inserted into a bolt hole from an inner side of the box section member, a sleeve of a nut holding part at the outer side is engaged with, whereby the nut is secured to the inner side of the box section member, a high strength bolt is inserted into the bolt hole from the outer side of joining hardware abutting against the outside of the box section member, and a male thread is screwed with the nut secured to the inner side of the box section member.

(3) A high strength bolted structure of a box section member and joining hardware characterized in that at least at a plurality of locations of high strength bolted locations of a box section member and joining hardware, a sleeve formed with slits in its longitudinal direction and able to be expanded and contracted in outer diameter elastically is fixed to a nut, a slit formed region of the sleeve is press-fit into a bolt hole from an inner side of the box section member, whereby the nut is secured to the inner side of the box section member, a high strength bolt is inserted into the bolt hole from the outer side of joining hardware abutting against the outside of the box section member, and a male thread is screwed with the nut secured to the inner side of the box section member.

(4) A high strength bolted structure of a box section member and joining hardware characterized in that at least at a plurality of locations of high strength bolted locations of a box section member and joining hardware, a sleeve having an engagement projection at its front end is fixed to a nut, the sleeve is inserted into a bolt hole from an inner side of the box section member, and the engagement projection of the sleeve projecting to the outer side of the box section member is bent outward so as to be fixed to the outer side of the box section member, whereby the nut is secured to the inner side of the box section member, a high strength bolt is inserted into the bolt hole from the outer side of joining hardware abutting against the outside of the box section member, and a male thread is screwed with the nut secured to the inner side of the box section member.

(5) A high strength bolted structure of a box section member and joining hardware characterized in that at least at a plurality of locations of high strength bolted locations of a box section member and joining hardware, an engagement tab of a nut holding part is engaged with an outer circumference of a nut, a sleeve of the nut holding part is inserted into a bolt hole from an inner side of the box section member, the front end projecting to the outer side is bent outward so as to be fixed to the outer side of the box section member, whereby the nut is secured to the inner side of the box section member, a high strength bolt is inserted into the bolt hole from the outer side of joining hardware abutting against the outside of the box section member, and a male thread is screwed with the nut secured to the inner side of the box section member.

(6) A high strength bolted structure of a box section member and joining hardware characterized in that at least at a plurality of locations of high strength bolted locations of a box section member and joining hardware, a nut is secured by bonding to an inner side of a box section member, a high strength bolt is inserted into the bolt hole from the outer side of joining hardware abutting against the outside of the box section member, and a male thread is screwed with the nut secured to the inner side of the box section member.

(7) A high strength bolted structure of a box section member and joining hardware characterized in that at least at a plurality of locations of high strength bolted locations of a box section member and joining hardware, a female thread end of a nut abutting against an inner side of the box section member is provided with an engagement hole having an engagement rim, an engagement hook of a front end of a sleeve of a nut holding part inserted into a bolt hole is pushed over the engagement rim to be fixed there, whereby the nut is secured to the inner side of the box section member, a high strength bolt is inserted into the bolt hole from the outer side of joining hardware abutting against the outside of the box section member, and a male thread is screwed with the nut secured to the inner side of the box section member.

(8) A high strength bolted structure of a box section member and joining hardware as set forth in any one of (1) to (7), characterized in that the high strength bolt used is one provided with a torque control mechanism at its head and used with a washer abutting against its head seat face.

(9) A method of securing a nut to an inner side of a box section member characterized by, at least at a plurality of locations of high strength bolted locations of the box section member and joining hardware, screwing a male thread of a nut-setting bolt with a female thread of a nut arranged at an inner side of the box section member, inserting the nut-setting bolt into a bolt hole from the inner side of the box section member, and, in the state projecting out to the outer side, securing a nut to the inner side of the box section member by a nut holding part inserted into the nut-setting bolt from the outer side.

(10) A method of securing a nut to an inner side of a box section member characterized by, at least at a plurality of locations of high strength bolted locations of the box section member and joining hardware, screwing a male thread of a nut-setting bolt with a female thread of a nut arranged at an inner side of the box section member, inserting the nut-setting bolt into a bolt hole from the inner side of the box section member, and, in the state projecting out to the outer side, securing a nut to the inner side of the box section member by bonding.

(11) A method of securing a nut to an inner side of a box section member as set forth in (9) or (10), characterized by rotating the nut-setting bolt to detach it after securing the nut to the inner side of the box section member.

(12) A method of securing a nut to an inner side of a box section member as set forth in (9) or (10), characterized by screwing and tightening a temporary nut to the nut-setting bolt from an outer side of the box section member to temporarily tighten the nut-setting bolt after securing the nut to the inner side of the box section member.

(13) A Torque-Shear type high strength bolt characterized by having a male thread to be screwed into a female thread and able to be tightened by being engaged at its head side with a tightening tool comprised of an inner sleeve and an outer sleeve operating in association, being formed at a front end of its head with a pintail for torque control, being formed with a breakneck comprised of a breaking groove between its head and pintail, having a washer of a polygonal shape of a diameter larger than the diameter of the outer circumference of the head inserted and abutted between a seat face of the bolt head and a steel member to be joined, and tightened by its pintail being gripped by the inner sleeve of the tightening tool and the washer being engaged with the outer sleeve.

(14) A Torque-Shear type high strength bolt as set forth in (13), characterized in that the bolt strength is at least 800 N/mm$^2$.

(15) A Torque-Shear type high strength bolt as set forth in (13) or (14), characterized in that at least the head seat face and thread of the bolt are lubricated.

(16) A Torque-Shear type high strength bolt as set forth in (13) or (14), characterized in that a bolt head side seat face of a washer inserted and abutted between a head seat face of the bolt and a steel member to be joined is lubricated.

(17) A Torque-Shear type high strength bolt as set forth in (13) or (14), characterized in that at least a head seat face and thread of the bolt are lubricated and a bolt head side seat face of a washer inserted and abutted between a head seat face of the bolt and a steel member to be joined is lubricated.

(18) A bolting method of a steel member using a Torque-Shear type high strength bolt as set forth in any one of (13) to (17) formed at the front end of its head with a pintail for torque control and formed between the head and the pintail with a breakneck comprised of a breaking groove, said bolting method using a Torque-Shear type high strength bolt characterized by, when screwing a male thread into a female thread of a securing side to tighten the bolt, inserting and abutting a washer of a polygonal shape and a diameter larger than the diameter of the outer circumference of the head, using a tightening tool comprised of an inner sleeve and an outer sleeve operating in association, and gripping and rotating the pintail by the inner sleeve so as to control the tension introduced to the bolt by a breakneck made to break at a certain breaking torque by a rotational torque obtained as a reaction force of a washer through the outer sleeve.

(19) A bolting method using a Torque-Shear type high strength bolt as set forth in (18), characterized in that the Torque-Shear type high strength bolt used is a through bolt and the object formed with a female thread for screwing with its male thread is a nut.

(20) A bolting method using a Torque-Shear type high strength bolt as set forth in (18), characterized in that the Torque-Shear type high strength bolt used is a tap bolt and the object formed with a female thread for screwing with its male thread is a steel member to be joined.

BRIEF DESCRIPTION OF THE DRAWINGS

FIG. 3(a) is an explanatory front view of a nut holding part used in FIG. 1.

FIG. 3(b) is an explanatory partially cutaway side view of FIG. 3(a).

FIG. 4(a) is an explanatory side view of an example of the structure of a Torque-Shear type high strength bolt of the present invention used in FIG. 1 and a washer at the bolt head side.

FIG. 4(b) is an explanatory view seen along the arrow Ba–Bb in FIG. 4(a).

FIG. 7(*c*) is an explanatory partially cutaway sectional side view showing a procedure for securing a nut using a nut-setting bolt of FIG. 5 in the process of obtaining the high strength bolted join structure of FIG. 1, specifically explaining the state of screwing a nut holding part into a nut and removing the nut-setting bolt from the nut.

FIG. 8(*b*) is an explanatory sectional side view showing an example of a high strength bolting method of a box section column and split T-section which secures a nut by a holding part in the process of obtaining the high strength bolted structure of FIG. 1, specifically explaining the state of inserting a Torque-Shear type high strength bolt with a washer passed over it from the outside of a split T-section into a bolt hole.

FIG. 8(*c*) is an explanatory sectional side view showing an example of a high strength bolting method of a box section column and split T-section which secures a nut by a holding part in the process of obtaining the high strength bolted structure of FIG. 1, specifically explaining the state of main tightening a Torque-Shear type high strength bolt (immediately before completion of tightening) by a tightening tool comprised of an inner sleeve and outer sleeve operating in association.

FIG. 9 is an explanatory sectional side view of the state of completion of main tightening in an example of a join structure of a box section column and split T-section using a Torque-Shear type high strength bolt in a second embodiment of the present invention.

FIG. 10(*a*) is an explanatory partially cutaway sectional side view of an example of the structure of a sleeved nut used in FIG. 9.

FIG. 10(*b*) is an explanatory view seen along the arrow Ca–Cb in FIG. 10(*a*).

FIG. 11(*b*) is an explanatory partially cutaway sectional side view of FIG. 11(*a*).

FIG. 13(*b*) is an explanatory partially cutaway sectional side view showing a procedure for securing a nut using a nut-setting bolt in the process of obtaining the high strength bolted structure of FIG. 9, specifically explaining the state of pulling a nut-setting bolt to insert a nut holding part in a nut side sleeve.

FIG. 13(*c*) is an explanatory partially cutaway sectional side view showing a procedure for securing a nut using a nut-setting bolt in the process of obtaining the high strength bolted structure of FIG. 9, specifically explaining the state, after securing a nut to a box section column by a nut holding part, of detaching the nut-setting bolt from the nut.

FIG. 15(*b*) is an explanatory view seen along the arrow Da–Db of FIG. 15(*a*).

FIG. 17(*b*) is an explanatory partially cutaway sectional side view showing a procedure for securing a nut using a nut-setting bolt in the process of obtaining the high strength bolted structure of FIG. 14, specifically explaining a state of pulling a nut-setting bolt to bond a washer-like part of a nut with an inside surface of a box section column.

FIG. 17(*c*) is an explanatory partially cutaway sectional side view showing a procedure for securing a nut using a nut-setting bolt in the process of obtaining the high strength bolted structure of FIG. 14, specifically explaining a state of bonding and securing a nut to a box section column, then detaching a nut-setting bolt from the nut.

FIG. 21(*b*) is an explanatory partially cutaway sectional side view showing an example of a method (procedure) of securing a nut using a nut-setting bolt in the process of obtaining the high strength bolted structure of FIG. 19, specifically explaining the state of pulling a nut-setting bolt to bond a sleeve fastened to a washer-like part of a nut to a bolt hole of a box section column.

FIG. 38(*b*) is an explanatory view of a nut of a conventional Torque-Shear type high strength bolt set.

FIG. 38(*c*) is an explanatory view of a washer of a conventional Torque-Shear type high strength bolt set.

FIG. 39(*a*) is an explanatory sectional side view showing an example of tightening a bolt in an example of a conventional bolded structure using a Torque-Shear high strength bolt, specifically explaining the state of primary tightening of the nut.

FIG. 39(*b*) is an explanatory sectional side view showing an example of tightening a bolt in an example of a conventional bolded structure using a Torque-Shear high strength bolt, specifically explaining the state of main tightening by a tightening tool comprising an inner sleeve and outer sleeve operating in association.

FIG. 39(*c*) is an explanatory sectional side view showing an example of tightening a bolt in an example of a conventional bolded structure using a Torque-Shear high strength bolt, specifically explaining the state of completion of main tightening by a tightening tool.

BEST MODE FOR WORKING THE INVENTION

Figure 1:
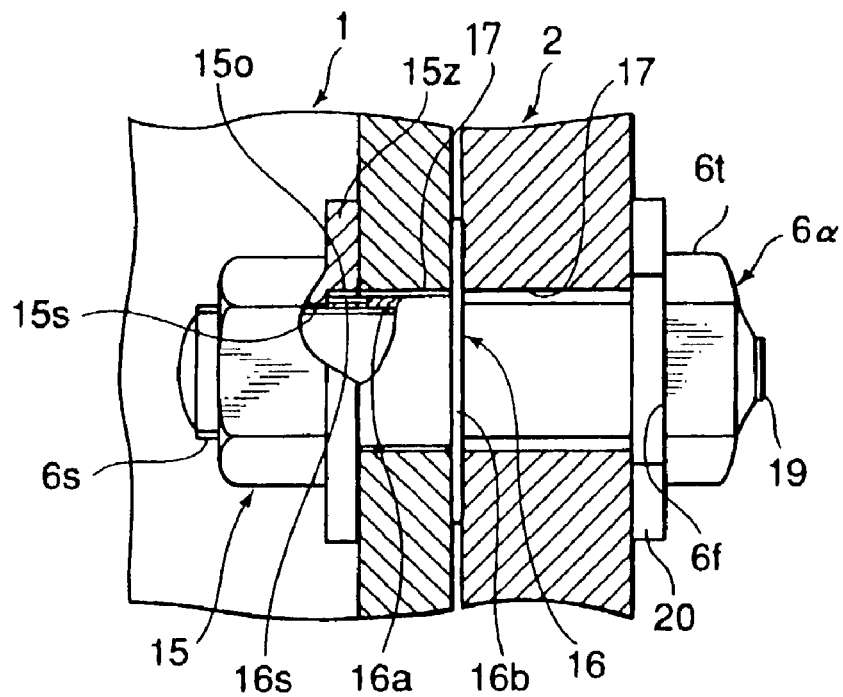
FIG. 1 is an explanatory partially cutaway sectional side view of the state of completion of main tightening in an example of a join structure of a box section column and a split T-section by a Torque-Shear type high strength bolt in a first embodiment of the present invention.

The high strength bolted structure and method of securing a nut of the present invention is mainly applied to the case of high strength bolting of a box section column and joining hardware in a high strength bolted structure of a box section column and H-section beam using split T-sections, end plates, angles, fish plates, and other joining hardware.

In the high strength bolted structure and method of securing a nut of the present invention, basically the nut (herein, including a nut alone, a nut formed integrally with a washer, a nut joined with an independent washer, etc., hereinafter referred to as a "nut") is secured in advance to an inner side of the box section column, and, when bringing a split T-section (hereinafter joining hardware being represented by a "split T-section" in the explanation) into abutment with the outer side of the box section column and bolting it at a high strength, a high strength bolt is inserted into a bolt hole from an outer side, its male thread is screwed into a female thread of the nut secured to the inner side, and the head side of the high strength bolt at the outer side is rotated by a tightening tool to tighten it. As the high strength bolt, mainly a Torque-Shear type high strength bolt provided with a torque control mechanism at the head side is used. When using such a Torque-Shear type high strength bolt, a special tightening tool different from a conventional tightening tool is used.

When securing the nut to the inside of the box section column, a special system (bolt transport system and pullout tool) such as disclosed in Japanese Unexamined Patent Publication (Kokai) No. 2000-213070 filed by the same assignee may be used. When using this system, a nut-setting bolt having a nut screwed to it is used as the bolt, this is stood up and transported in that state by a bolt transport system to the position of a bolt hole in the box section column, the front end is pulled up to the outside by a pullout tool inserted into the bolt hole from the outer side, and the nut screwed at the nut-setting bolt at the inner side of the box section column is secured to the inside of the box section column by a nut holding part, sleeve, bonding, or other securing means in that state.

The nut holding part or sleeve used here is mainly made of a metal or a plastic. When the nut holding part is metal and the front and back surfaces of a flange part become the joining surface, it is preferable that the outer diameter of the flange part be made two to three times the bolt shaft diameter.

When high strength bolting the split T-section to the box section column, the nut-setting bolt is detached from the nut, the split T-section is brought into abutment with the box section column, a high strength bolt is inserted into the bolt hole from the outer side and screwed with the nut secured to the inner side of the box section column, and the bolt head side is rotated by a tightening tool to tighten it and thereby join the split T-section to the box section column.

The work of high strength bolting the box section column and split T-sections (joining hardware) can be completed at the factory, but to ease restrictions when attaching the beams at the construction site, for example, it is possible to join only the lower split T-section, transport the assembly to the construction site, and join the upper split T-section when attaching the beam at the construction site or join the upper and lower split T-sections before construction at the construction site or when attaching the beam. As the high strength bolt, a Torque-Shear type high strength bolt provided with a torque control mechanism at its head side is mainly used, but for the join structure as a whole, it is also possible to use a one-side bolt or high strength hexagonal bolt in some parts.

First Embodiment

Next, a first embodiment of the present invention will be explained in detail with reference to FIG. 1 to FIG. 8(*c*).

The first embodiment is the case of application of the present invention to a high strength bolted structure of a box section column 1 and a split T-section 2 in a high strength bolted structure of a box section column and H-section beam where a beam of an H-section beam (not shown) is attached to a column of a rectangular section box section member (hereinafter referred to as a "box section column") 1 through joining hardware of a split T-section 2.

FIG. 1 shows the state of completion of the join by a Torque-Shear type high strength bolt 6α of the present invention in an example of the high strength bolted structure of a box section column 1 and split T-section 2 according to the present invention.

Note that a pair of an upper and lower split T-section 2 is used for one H-section beam when attaching an H-section beam to a box section column 1. Normally, one split T-section 2 is joined to the box section column 1 by a plurality of high strength bolts. Here, however, an explanation will be made illustrating mainly a single Torque-Shear type high strength bolt 6α in a bolted structure using Torque-Shear type high strength bolts 6α of the present invention provided with torque control mechanisms at their heads, different from conventional Torque-Shear type high strength bolts, as the high strength bolts. Note that the same applies in the second to seventh embodiments below.

Figure 2A:
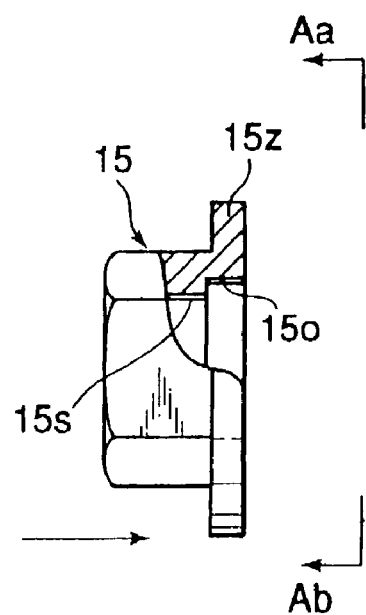
FIG. 2(a) is an explanatory partially cutaway sectional side view of an example of the structure of a nut used in FIG. 1.
Figure 2B:
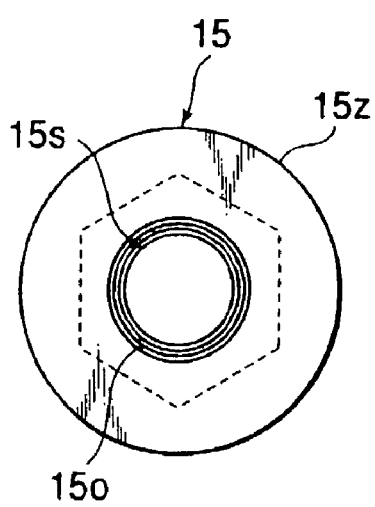
FIG. 2(b) is an explanatory perspective view along the line Aa–Ab in FIG. 2(a).

In FIG. 1, reference numeral 15 is a nut secured to the inner side of the box section column 1. As shown in FIG. 2(*a*) and FIG. 2(*b*), here, it is of a shape formed integrally with a washer. It has a small diameter female thread 15*s* and a large diameter female thread 15*o* at the washer-like part 15*z*. Reference numeral 16 is a nut holding part used for holding the nut 15 at the inner side of the box section column 1. This nut holding part is made of a metal. As shown in FIG.

3(a) and FIG. 3(b), it is comprised of a sleeve part 16a and a flange part 16b and has a male thread 16s at the front end of the sleeve part 16a.

The sleeve part 16a of the nut holding part 16 is inserted into a bolt hole 17 from the outside of the box section column 1. The male thread 16s is screwed with the large diameter female thread 15o of the washer-like part 15z of the nut 15 whereby the flange part 16b is fixed to the outer side of the box section column 1. Here, since the front and back surfaces of the flange part 16b become the joining surfaces with the inner surfaces of the box section column 1 and split T-section 2, its outer diameter d0 is set to be two or three times the shaft diameter of the Torque-Shear type high strength bolt 6α so as to obtain stable joining surfaces.

The split T-section 2 brought into abutment with the outer surface of the flange part 16b of the nut holding part 16 at the outside of the box section column 1 is joined with the box section column 1 by screwing the Torque-Shear type high strength bolt 6α inserted into the bolt hole 17 from the outer side with the nut 15 secured to the inner side of the box section column 1 and tightening its head side.

The Torque-Shear type high strength bolt 6α has a male thread 6s to be screwed with the female thread 15s of the nut 15. As shown in FIG. 4(a) and FIG. 4(b), the head 6t is formed with a pintail 18 for control of the tension. A breakneck 19 comprised of a breaking groove is formed between the head 6t and pintail 18. This differs from the conventional Torque-Shear type high strength bolt 6 shown in FIG. 38(a) to FIG. 38(c).

A washer 20 having a hexagonal outer circumferential shape is inserted at and brought into abutment with a seat face 6f the head 6t of the Torque-Shear type high strength bolt 6α. This washer, as shown in FIG. 4(a) and FIG. 4(b), has a hexagonal outer circumferential shape, is larger in diameter than the outer diameter of the bolt head 6t, and is designed not to interfere with the bolt head 6t at the time of tightening by a tightening tool 21.

Figure 8A:
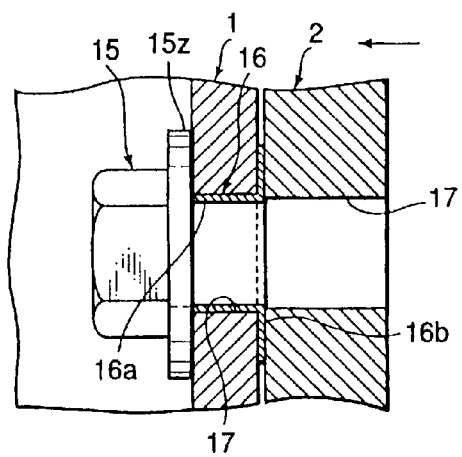
FIG. 8(*a*) is an explanatory sectional side view showing an example of a high strength bolting method of a box section column and split T-section which secures a nut by a holding part in the process of obtaining the high strength bolted structure of FIG. 1, specifically explaining the state of bringing a split T-section into abutment with a box section column.
Figure 8B:
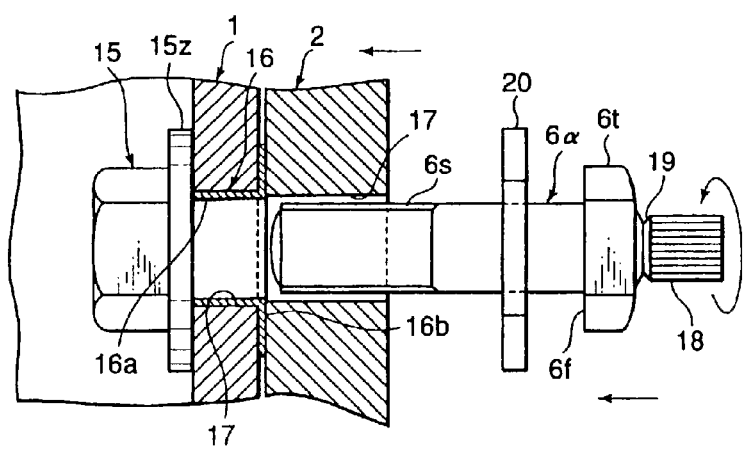
Figure 8C:
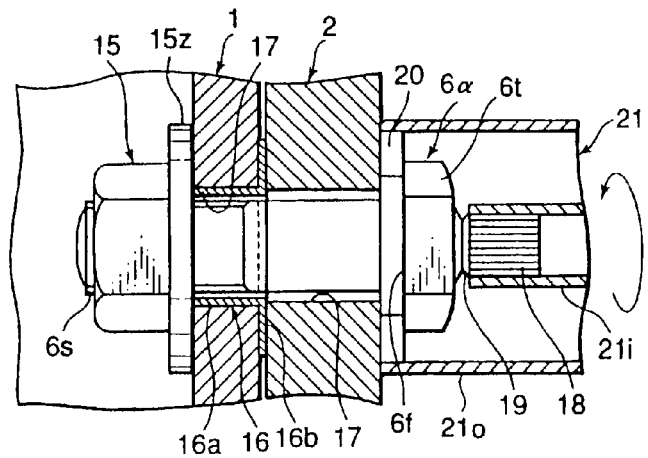

The washer 20 plays an important role in controlling the tension applied to the bolt, that is, when tightening the Torque-Shear type high strength bolt 6α by the tightening tool 21 (see FIG. 8(c)), it is engaged with an outer sleeve 21o of the tightening tool 21, an inner sleeve 21i of the tightening tool 21 grips and turns the pintail 18 of the bolt head 6t, and the breakneck 19 is broken at a predetermined breaking torque by the rotational torque of the reaction force from the washer 20.

Note that the configuration of the Torque-Shear type high strength bolt 6α and a joining method using the same will be explained in more detail later.

An example of a joining method for obtaining a bolted structure of the box section column 1 and split T-section 2 in the first embodiment will be explained next with reference to FIG. 5(a) and FIG. 5(b) to FIG. 7(c).

[Method of Securing Nut to Inside of Box Section Column]

(1) Method of Using Nut-Setting Bolt

Figure 5A:
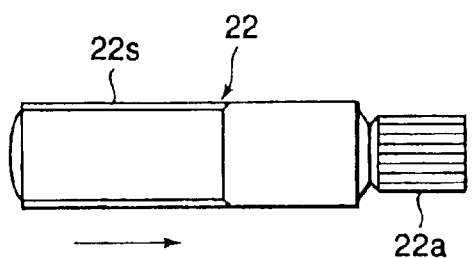
FIG. 5(a) is an explanatory side view of an example of the structure of a nut-setting bolt used for securing a nut at the inside of a box section column.
Figure 5B:
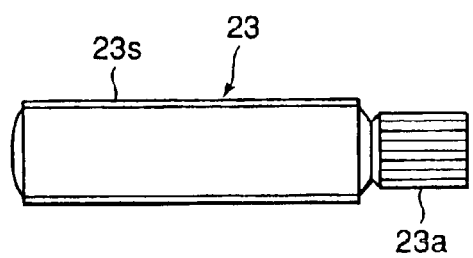
FIG. 5(b) is an explanatory side view of an example of the structure of another nut-setting bolt used for securing a nut at the inside of a box sectional column.
Figure 6:
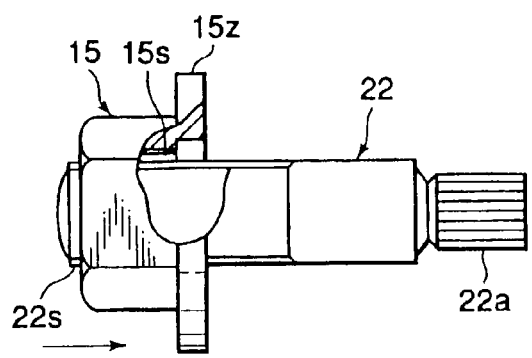
FIG. 6 is an explanatory partially cutaway sectional side view of the state of a nut screwed into a nut-setting bolt used for an example of a method of securing a nut in the process of obtaining the high strength bolted structure of FIG. 1.

With this method, a nut-setting bolt 22 formed with a male thread 22s at one side and formed with a holding part 22a at the end of the other side as shown in FIG. 5(a) (or a nut-setting bolt 23 formed with a male thread 23s over its entire surface and formed with a holding part 23a at the end of the other side as shown in FIG. 5(b)) is used. As shown in FIG. 6, the small diameter female thread 15s of the nut 15 is screwed with the male thread 22s, the holding part side of the nut-setting bolt 22 is passed through the bolt hole 17 from the inner side of the box section column 1 to project to the outer side, and the nut 15 is secured in that state.

Therefore, the nut-setting bolt 22 has to be moved to a predetermined position inside the box section column 1 (directly under bolt hole 17), passed through the bolt hole 17, and pushed up or pulled up to the outside. As the means for this, for example, the bolt transport system and pullout tool (not shown) disclosed in Japanese Unexamined Patent Publication (Kokai) No. 2000-213070 filed by the same assignee can be used.

Figure 7A:
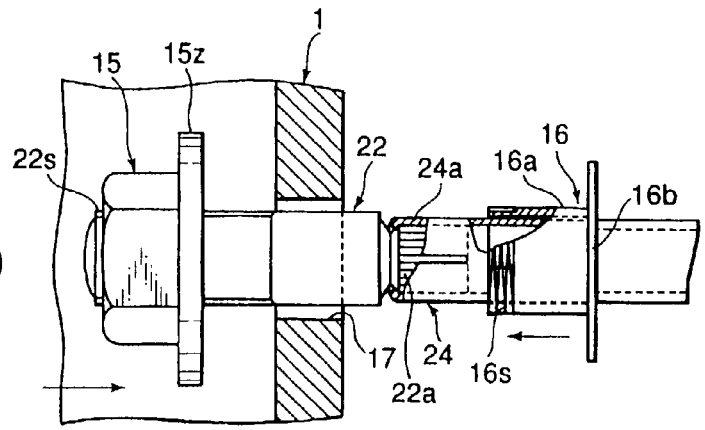
FIG. 7(a) is an explanatory partially cutaway sectional side view showing a procedure for securing a nut using a nut-setting bolt of FIG. 5 in the process of obtaining the high strength bolted join structure of FIG. 1, specifically explaining the state of inserting a nut-setting bolt of FIG. 6 into a bolt hole of a box section column.
Figure 7B:
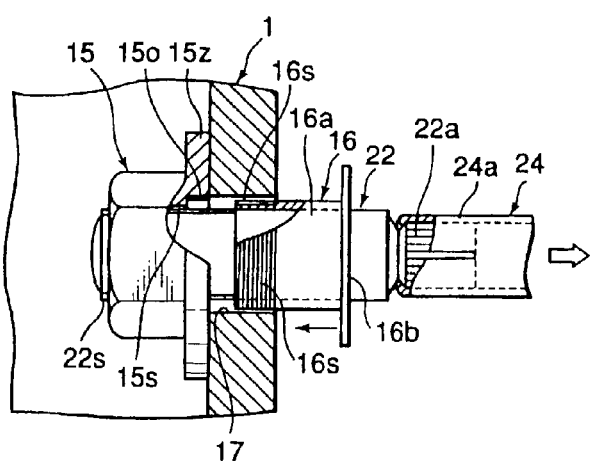
FIG. 7(*b*) is an explanatory partially cutaway sectional side view showing a procedure for securing a nut using a nut-setting bolt of FIG. 5 in the process of obtaining the high strength bolted join structure of FIG. 1, specifically explaining the state of inserting a nut-setting bolt into a bolt hole of a box section column and a fitting a nut holding part into a sleeve at the nut side from the outside.

That is, the nut-setting bolt 22 is loaded into the bolt transport system in the state with its holding part 22a up and moved to a predetermined position at the inner side of the box section column 1 (directly under bolt hole 17). A holding part 24a of a pullout tool 24 passed through a nut holding part 16 (sleeve 16α) in advance is inserted into the bolt hole 17 of the box section column 1. As shown in FIG. 7(a), the holding part 22a of the nut-setting bolt 22 is gripped and pulled up, then as shown in FIG. 7(b), the seat face of the washer-like part 15z of the nut 15 is pushed against the inner surface of the box section column 1. In this state, the sleeve part 16α of the nut holding part 16 is inserted into the bolt hole 17, and the male thread 16s of the sleeve part 16α is screwed with the large diameter female thread 15o of the washer-like part 15z of the nut 15 for tightening.

Figure 7C:
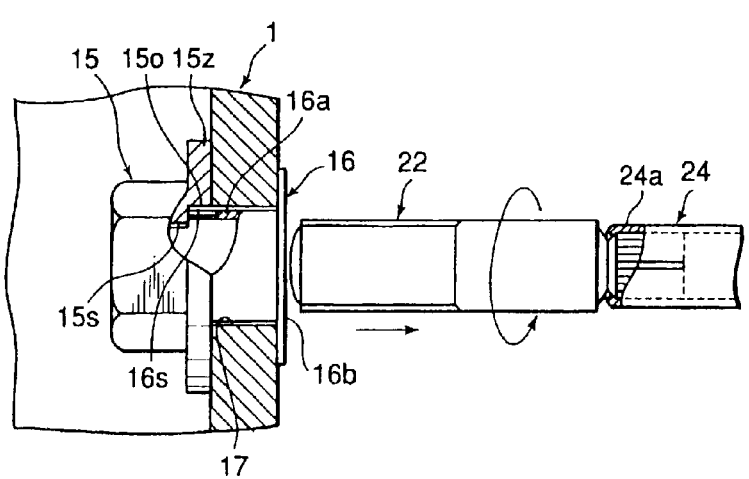

By completion of this tightening, the flange part 16b of the nut holding part 16 is fixed to the outer surface of the box section column 1, whereby it is possible to reliably secure the nut 15 to the inner side of the box section column 1 as shown in FIG. 7(c). The nut-setting bolt 22 is detached from the nut 15 at a suitable time after securing the nut.

(2) When the join portion is within the reach of a worker, it is also possible to secure the nut 15 to the inner side of the box section column 1 without using the above nut-setting bolt.

[High Strength Bolting Method of Box Section Column and Split T-Section]

A high strength bolting method of the box section column 1 and the split T-section 2 after securing the nut 15 to the inner side in this way will be explained next with reference to FIG. 8(a) to FIG. 8(c).

As shown in FIG. 7(c), the nut holding part 16 is used to secure the nut 15 to the inner side of the box section column 1 and the nut-setting bolt 22 is detached from the nut 15. In that state, as shown in FIG. 8(a), the split T-section 2 is made to abut against the outside of the box section column 1 with the bolt holes 17 of the box section column 1 and the split T-section 2 aligned (the diameters of the two bolt holes 17 do not necessarily have to be the same). As shown in FIG. 8(b), the Torque-Shear type high strength bolt 6α with the washer 20 inserted over it is inserted from the outside of the split T-section 2 through the inside of the bolt hole 17 of the split T-section 2 and the sleeve part 16α of the nut holding part 16 and screwed at its male thread 6s with the small diameter female thread 15s of the nut 15 secured to the inside of the box section column 1 for primary tightening.

After the primary tightening, as shown in FIG. 8(c), main tightening is performed by a tightening tool 21 provided with a mechanism for operating the inner sleeve 21i and outer sleeve 21o in association. The tightening tool 21 utilizes a principle basically the same as the known tightening tool 14 shown in FIG. 39(b) to FIG. 39(c), but is provided with a mechanism for operating in association the inner sleeve 21i for gripping and rotating the pintail 18 of the Torque-Shear type high strength bolt 6α and the outer sleeve 21o for engaging with the washer 20 abutted against the seat face 6f of the head 6t of the Torque-Shear type high strength bolt 6α. It is not the same as the known tightening tool 14.

When tightening the Torque-Shear type high strength bolt 6α by this tightening tool 21, the pintail 18 formed in the head 6t of the Torque-Shear type high strength bolt 6α is gripped by the inner sleeve 21i, the outer sleeve 21o is engaged with the washer 20, the pintail 18 is rotated, and the breakneck 19 of the breaking groove of the pintail 18 is broken at a predetermined breaking torque by the rotational torque of the reaction force from the washer through the outer sleeve 21o. It is therefore possible to realize a stable high strength bolted structure able to easily control the tension introduced to the bolt.

Note that the nut holding part 16 is not required in the state of completion of the tightening of the Torque-Shear type high strength bolt 6α, but there is no problem even if it is left as it is.

In a bolted structure of a box section column 1 and a split T-section 2 using the Torque-Shear type high strength bolt 6α of the first embodiment, the bolt is tightened at the outer side, so there is no need to use an expensive one-side bolt at the construction site and the cost can be greatly reduced. Further, the work of tightening the bolt can be performed in parallel when attaching the H-section beam to the box section column 1 through the split T-section 2 at the construction site of the columns, so no restrictions are imposed on the work of attaching the H-section beam and a good work efficiency can be secured. Further, since a Torque-Shear type high strength bolt 6α having a torque control pintail 18 at the head 6t side is used, when securing the nut 15 to the inner side of the box section column 1 and rotating the bolt head 6t side at the outer side for tightening, it is possible to easily control the tension introduced to the bolt and possible to realize a stable join structure.

Second Embodiment

Next, a second embodiment of the present invention will be explained in detail with reference to FIG. 9 to FIG. 13(c). The second embodiment differs from the first embodiment in the method (structure) of securing the nut 15. A detailed explanation of the portions common with the first embodiment will be omitted.

FIG. 9 shows the state of completion of a join by a Torque-Shear type high strength bolt 6α in an example of a high strength bolted structure between a box section column and split T-section 2 according to the present invention. In FIG. 9, reference numeral 15 is a nut having a female thread 15s secured to the inner side of the box section column 1. As shown in FIG. 10(a) and FIG. 10(b), here it is of a shape formed integrally with the washer-like part 15z and secures the sleeve 25 to the washer-like part 15z.

This sleeve 25 is made of metal. It is secured by inserting and bonding its base end to a hole in the washer-like part 15z. Therefore, it has an outer diameter slightly smaller than the bolt hole 17 and is inserted into the bolt hole 17 of the box section column 1. The sleeve 25 has inserted in it a sleeve part 26a of a nut holding part 26 inserted into the bolt hole 17 from the outside of the box section column 1. The inner circumferential surface of the sleeve 25 and the outer circumferential surface of the sleeve 26a are bonded by an adhesive b.

Figure 11A:
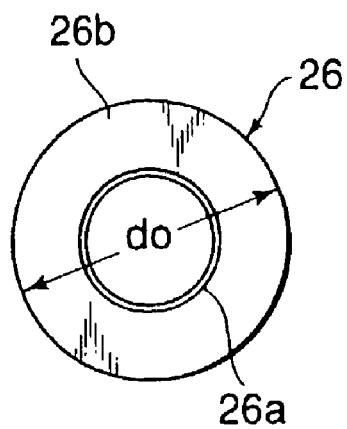
FIG. 11(*a*) is an explanatory front view of a nut holding part used in FIG. 9.
Figure 11B:
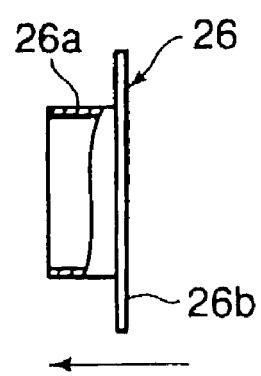

The nut holding part 26 is made of metal and, as shown in FIG. 11(a) and FIG. 11(b), is comprised of the sleeve part 26a and flange part 26b. The inner diameter of the sleeve part 26a is slightly larger than the shaft diameter of the Torque-Shear type high strength bolt 6α. The male thread 6s can be easily inserted.

Further, the flange part 26b fixes the nut 15 to the outer surface of the box section column 1. Here, since the front and back surfaces become the join surfaces, the outer diameter do is set to a diameter of two to three times the shaft diameter of the Torque-Shear type high strength bolt 6α so as to stabilize the join surfaces.

The sleeve part 26a may be formed to taper slightly to facilitate insertion into the sleeve 25 of the nut 15 side. By the sleeve part 26a of the nut holding part 26 being inserted into and bonded with the sleeve 25 secured to the washer-like part 15z from the outer surface of the box section column 1 and the flange part 26b being fixed to the outer surface of the box section column 1, the nut 15 is reliably secured to the inner side of the box section column 1 through the sleeve 25 and nut holding part 26.

The Torque-Shear type high strength bolt 6α has a washer 20 inserted over it and is similar to the one of the first embodiment. By inserting it into the bolt hole 17 from the outside of the split T-section 2 brought into abutment with the outside of the box section column 1, screwing its male thread 6s with the female thread 15s of the nut 15 secured to the inner side of the box section column 1, and tightening it at the head 6t side by a tightening tool 21 similar to the first embodiment, the box section column 1 and the split T-section 2 are joined. Note that the sleeve 25 at the nut 15 side and the nut holding part 26 are not required in the state of completion of tightening of the Torque-Shear type high strength bolt 6α, but pose no problem even if left as they are.

Figure 12:
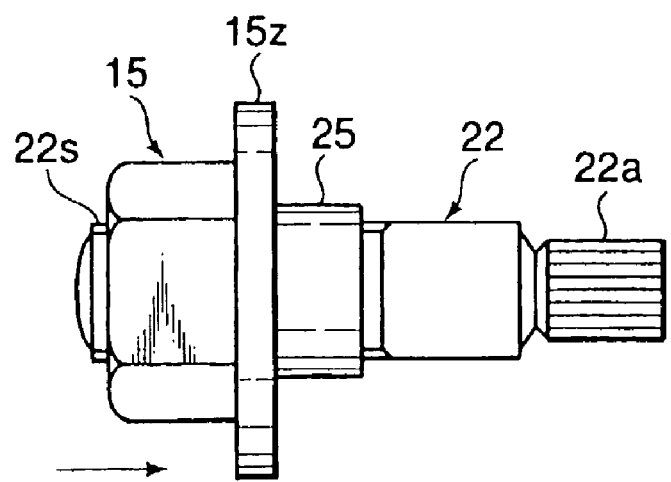
FIG. 12 is an explanatory side view of the state of screwing a nut on a nut-setting bolt used in the example of the method of securing a nut in the process of obtaining the high strength bolted structure of FIG. 9.

A joining method for obtaining the bolted structure of the box section column 1 and split T-section 2 of the second embodiment will be explained next with reference to FIG. 12 to FIG. 13(c).

[Method of Securing Nut to Inside of Box Section Column]

This method uses a system and nut-setting bolt 22 similar to those of the first embodiment. As shown in FIG. 12, the female thread 15s of the nut 15 securing the sleeve 25 to the washer-like part 15z is screwed with the male thread 22s of the nut-setting bolt 22, and the nut-setting bolt 22 is transported to a predetermined position inside the box section column 1.

Figure 13A:
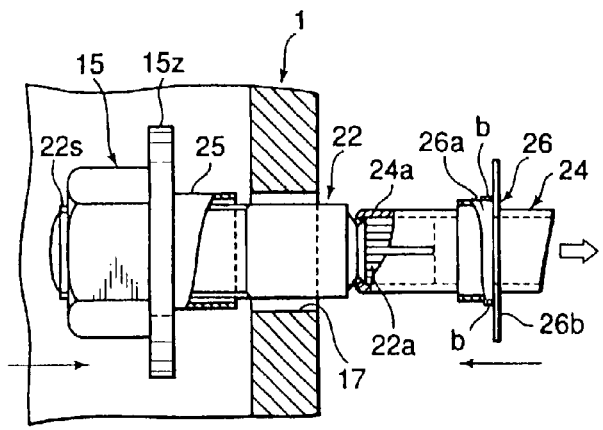
FIG. 13(*a*) is an explanatory partially cutaway sectional side view showing a procedure for securing a nut using a nut-setting bolt in the process of obtaining the high strength bolted structure of FIG. 9, specifically explaining the state of inserting a nut-setting bolt into a bolt hole of a box section column.
Figure 13B:
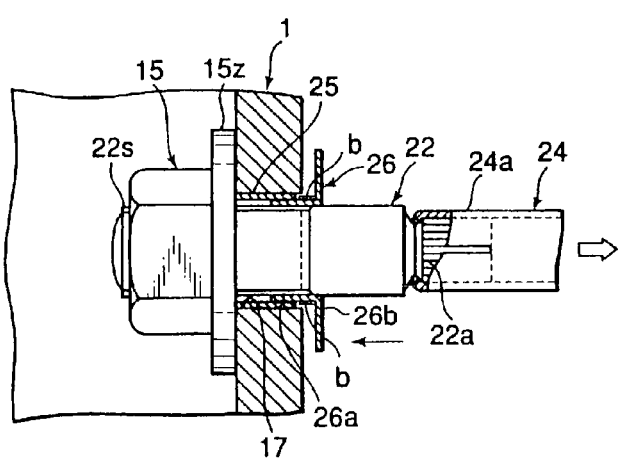
Figure 13C:
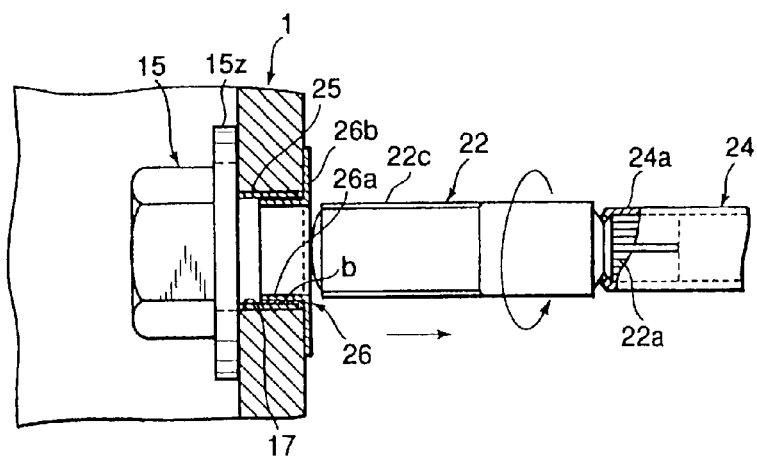

As shown in FIG. 13(a), the holding part 24a of a pullout tool 24 inserted through the sleeve part 26a of the nut holding part 26 in advance is inserted from the outer side of the bolt hole 17 of the box section column 1, the holding part 22a of the nut-setting bolt 22 is pulled up, and therefore, as shown in FIG. 13(b), the sleeve 25 of the nut 15 side is inserted into the bolt hole 17 of the box section column 1 and the washer-like part 15z of the nut 15 is pushed against the inner surface of the box section column 1.

In this state, the sleeve part 26a of the nut holding part 26 is inserted from the outside of the box section column 1 into the bolt hole 17 and inserted into the sleeve 25 of the nut side, then the outer circumferential surface of the sleeve part 26a is bonded to the inner circumferential surface of the sleeve 25 at the nut side by an adhesive b. After being sufficiently bonded, as shown in FIG. 13(c), the holding part 22a of the nut-setting bolt 22 is rotated to detach the nut-setting bolt 22 from the nut 15. In this way, it is possible to secure the nut 15 to the inner side of the box section column 1 through the sleeve 25 and nut holding part 26.

Note that if transporting this to the site in the state with the bonding force not sufficiently manifested etc., to prevent detachment due to impact during the transport, it is also possible to use a nut-setting bolt 23 having a thread 23s over its entire shaft as shown in FIG. 5(b), not detach the nut-setting bolt 23, screw a temporary holding nut with the nut-setting bolt 23 from the outer side to tighten it to an extent of hand tightening, then transport it to the site.

Further, in the second embodiment, the sleeve 25 at the nut 15 side and the sleeve 26*a* of the nut holding part 26 were secured by bonding, but it is also possible to form a female thread at the inner circumference of the sleeve 25, form a male thread at the outer circumference of the sleeve 26*a*, and secure them by screwing them together or form mating parts (recesses and projections) at the inner circumference of the sleeve 25 and the outer circumference of the sleeve part 26*a* and mate and turn them to secure them by engagement.

[High Strength Bolting Method of Box Section Column and Split T-Section]

The high strength bolting method of a box section column 1 and split T-section 2 after securing the nut 15 to the inner side of the box section column 1 in the above way is generally the same as with the case of the first embodiment, so an explanation will be omitted.

In a bolted structure of a box section column 1 and split T-section 2 using the Torque-Shear type high strength bolt 6α of the second embodiment, in addition to the increase in the number of parts, the load in the bonding work is somewhat greater than with the case of the first embodiment, but generally the same effects are obtained.

Third Embodiment

Next, a third embodiment of the present invention will be explained in detail with reference to FIG. 14 to FIG. 17(*c*). The third embodiment differs from the first and second embodiments in the method (structure) of securing the nut 15. Detailed explanations of portions common with the first and second embodiments will be omitted.

Figure 14:
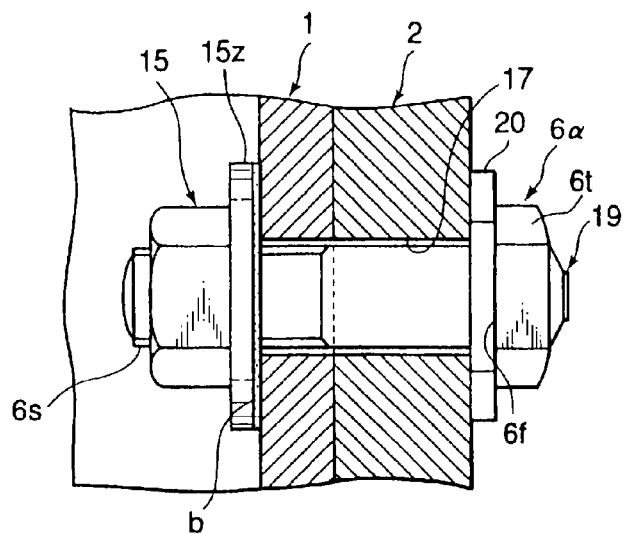
FIG. 14 is an explanatory sectional side view of the state of completion of main tightening in an example of a join structure of a box section column and split T-section by a Torque-Shear type high strength bolt in a third embodiment of the present invention.
Figure 15A:
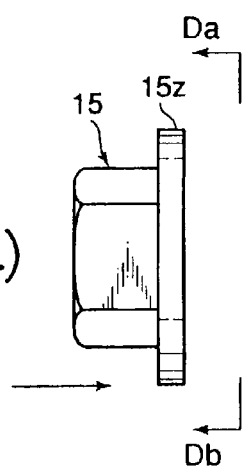
FIG. 15(*a*) is an explanatory side view of an example of the structure of a nut used in FIG. 14.
Figure 15B:
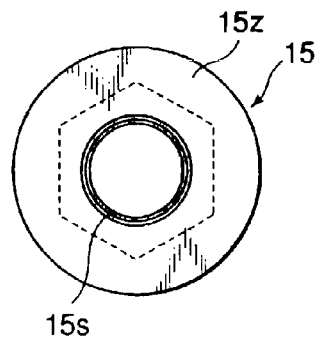

FIG. 14 shows the state of completion of the join by a Torque-Shear type high strength bolt 6α in an example of a bolted structure of a box section column 1 and a split T-section 2 according to the present invention. In FIG. 14, reference numeral 15 is a nut having a female thread 15*s* secured by bonding to the inner side of the box section column 1. As shown in FIG. 15(*a*) and FIG. 15(*b*), it is shaped formed integrally with a washer-like part 15*z* and is bonded and secured to the inner side of the box section column 1 by an adhesive *b*.

The Torque-Shear type high strength bolt 6α has a washer 20 inserted over it and is similar to the one of the first and second embodiments. By inserting it into the bolt hole 17 from the outside of the split T-section 2 brought into abutment with the outside of the box section column 1, screwing its male thread 6*s* with the female thread 15*s* of the nut 15 secured by bonding to the inner side of the box section column 1, and tightening it at the head 6*t* side by a tightening tool 21 similar to the first embodiment, the box section column 1 and the split T-section 2 are joined.

Figure 16:
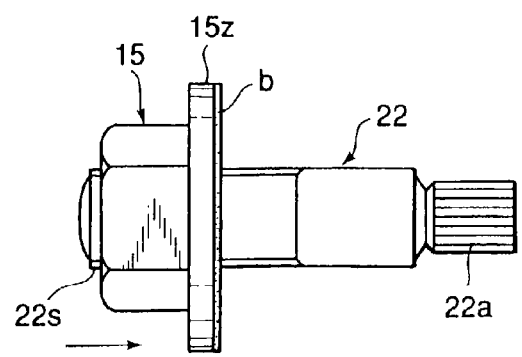
FIG. 16 is an explanatory side view showing the state of screwing a nut on a nut-setting bolt used in an example of securing a nut in the process of obtaining the high strength bolted structure of FIG. 14.

A joining method for obtaining the bolted structure of the box section column 1 and split T-section 2 of the third embodiment will be explained next with reference to FIG. 16 to FIG. 17(*c*).

[Method of Securing Nut to Inside of Box Section Column]

This method uses a system and nut-setting bolt 22 similar to those of the first and second embodiments. As shown in FIG. 16, the female thread 15*s* of the nut 15 coated with the adhesive *b* at the seat face of the washer-like part 15*z* is screwed with the male thread 22*s* of the nut-setting bolt 22, and the nut-setting bolt is transported to a predetermined position inside the box section column 1.

Figure 17A:
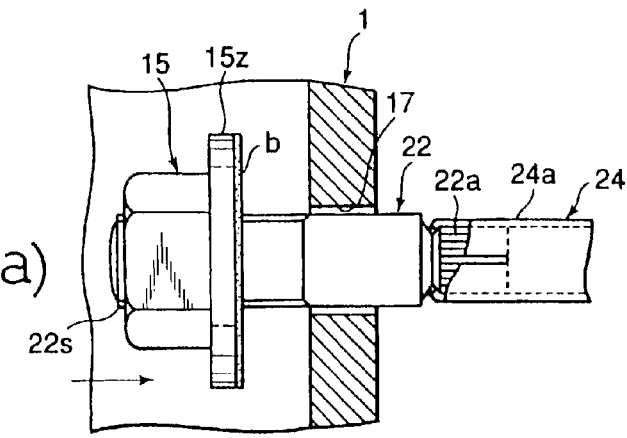
FIG. 17(*a*) is an explanatory partially cutaway sectional side view showing a procedure for securing a nut using a nut-setting bolt in the process of obtaining the high strength bolted structure of FIG. 14, specifically explaining the state of inserting a nut-setting bolt into a bolt hole of a box section column.
Figure 17B:
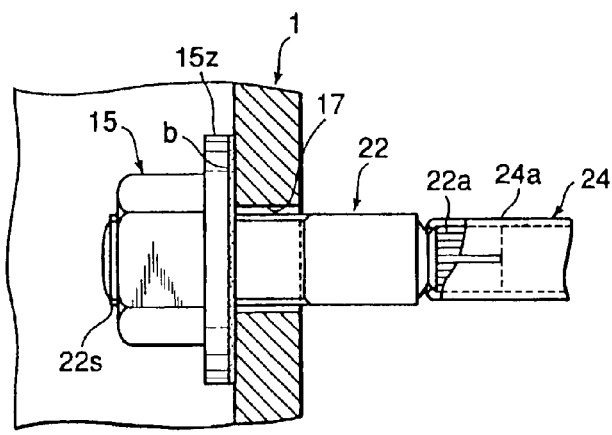
Figure 17C:
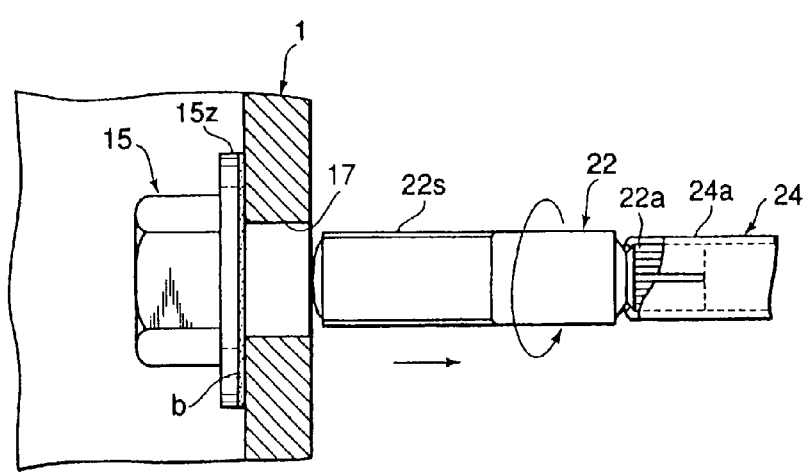

As shown in FIG. 17(*a*), the holding part 24*a* of a pullout tool 24 is inserted from the outer side of the bolt hole 17 of the box section column 1, the holding part 22*a* of the nut-setting bolt 22 is gripped and pulled up, and therefore, as shown in FIG. 17(*b*), the washer-like part 15*z* of the nut 15 is pushed against the inner surface of the box section column 1 and is secured by bonding by the adhesive *b*. When sufficiently secured by bonding, as shown in FIG. 17(*c*), the holding part 22*a* of the nut-setting bolt 22 is rotated to detach the nut-setting bolt 22 from the nut 15. In this way, it is possible to secure the nut 15 to the inner side of the box section column 1.

Figure 18:
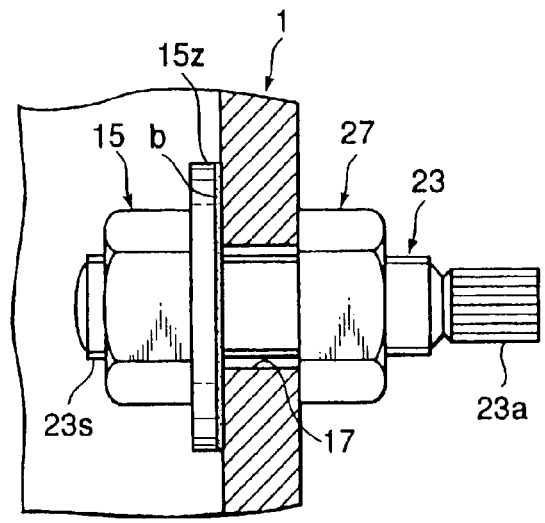
FIG. 18 is an explanatory sectional side view showing an example of the state when screwing a temporary nut on a nut-setting bolt and lightly tightening it through the state of FIG. 17(*b*).

Note that if transporting this to the site in the state with the bonding force not sufficiently manifested etc., to prevent detachment due to impact during the transport, for example it is also possible to use a nut-setting bolt 23 having a thread 23*s* over its entire shaft as shown in FIG. 18, not detach the nut-setting bolt 23, screw a temporary holding nut 27 with the nut-setting bolt 23 from the outer side to tighten it to an extent of hand tightening, then transport it to the site.

[High Strength Bolting Method of Box Section Column and Split T-Section]

The high strength bolting method of a box section column 1 and split T-section 2 after securing the nut 15 to the inner side of the box section column 1 in the above way is generally the same as with the case of the first and second embodiments, so an explanation will be omitted.

In a bolted structure of a box section column 1 and split T-section 2 using the Torque-Shear type high strength bolt 6α of the third embodiment, since the nut 15 is secured by bonding to the inner side of the box section column 1, compared with the first and second embodiments, there is no need to use the sleeve or nut holding part, the structure is easy, and the work of securing the nut is easy. The rest of the effects are generally the same as the case of the first and second embodiments.

Fourth Embodiment

Next, a fourth embodiment of the present invention will be explained in detail with reference to FIG. 19 to FIG. 21(*c*). The fourth embodiment shows the case of application of the present invention to a high strength bolted structure of a box section column 1 and split T-section 2.

Figure 19:
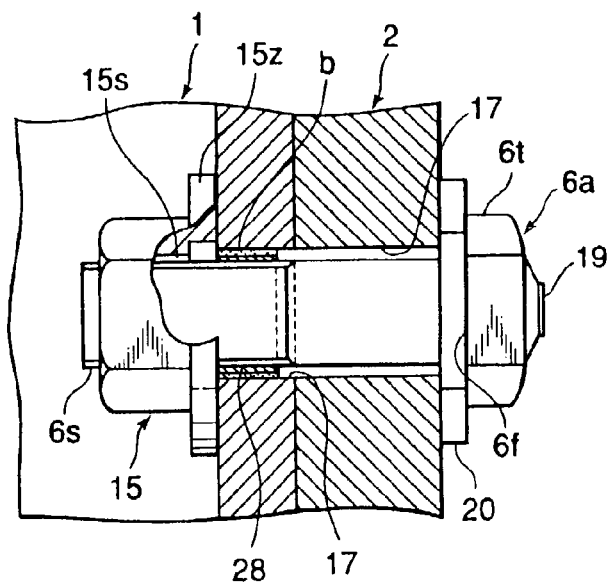
FIG. 19 is an explanatory sectional side view of the state of completion of main tightening in an example of a join structure of a box section column and split T-section by a Torque-Shear type high strength bolt in a fourth embodiment of the present invention.
Figure 20:
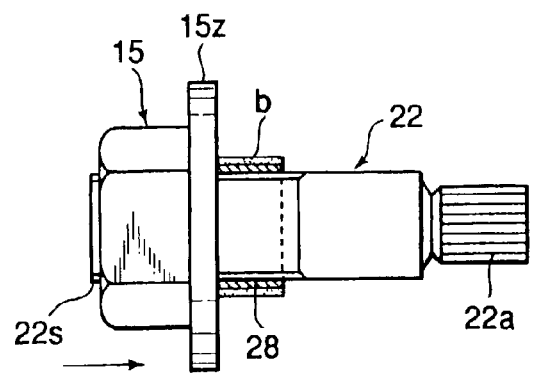
FIG. 20 is an explanatory side view of the state of screwing a nut fastened with a sleeve on a nut-setting bolt used in an example of the method of securing a nut in the process of obtaining the high strength bolted structure of FIG. 19.

FIG. 19 shows the state of completion of the bolting in an example of a high strength bolted structure of a box section column 1 and split T-section 2 according to the present invention. The fourth embodiment differs from the first to third embodiments in a structure of securing a nut to the inner side of the box section column 1. Detailed explanations of common portions will be omitted.

In FIG. 19, reference numeral 15 is a nut having a female thread 15*s* secured to the inner side of the box section column 1. In the same way as in the first to third embodiments, it has a shape formed integrally with a washer-like part and secures a sleeve 28 to the washer-like part 15*z*. The sleeve 28 is made of metal and is secured by inserting and bonding the base end inside the hole of the washer-like part 15*z*, so has an outer diameter slightly smaller than the bolt hole 17, is inserted into the bolt hole 17 of the box section column 1, and is bonded at its outer circumferential surface by an adhesive *b*. Note that at the time of bonding, a normal adhesive may be used for the bonding.

The Torque-Shear type high strength bolt 6α has a washer 20 inserted over it and is similar to the first to third embodiments. It is inserted into the bolt hole 17 from the outside of the split T-section 2 brought into abutment against the outside of the box section column 1, is screwed with the female thread 15*s* of the nut secured by bonding to the inner side of the box section column going through the bolt hole 17 of the sleeve 2 and hole of the sleeve 28, and, in the same way as the first to third embodiments, is tightened at its head side by a tightening tool 21 so as to join the box section column 1 and the split T-section 2.

The joining method for obtaining a bolted structure of the box section column 1 and split T-section 2 of the fourth embodiment will be explained next with reference to FIG. 20 to FIG. 21(*c*).

[Method of Securing Nut to Inside of Box Section Column]

The method uses a system and nut-setting bolt 22 similar to those of the first to third embodiments. As shown in FIG. 20, the female thread 15*s* of the nut 15 securing a sleeve 28 coated with the adhesive b at its outer circumferential surface to the washer-like part 15*z* is screwed with the male thread 22*s* of the nut-setting bolt 22, and the assembly is transported to a predetermined position inside the box section column 1.

Figure 21A:
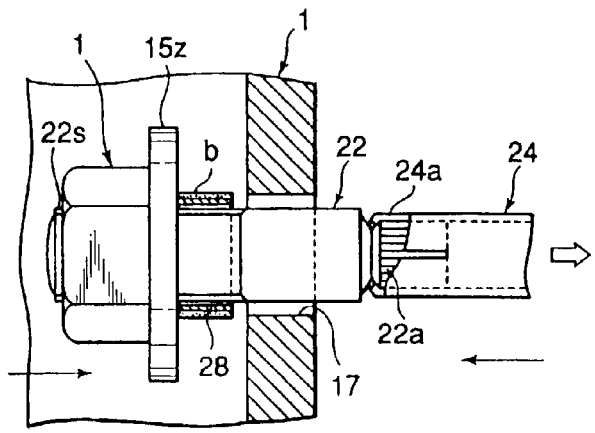
FIG. 21(*a*) is an explanatory partially cutaway sectional side view showing an example of a method (procedure) of securing a nut using a nut-setting bolt in the process of obtaining the high strength bolted structure of FIG. 19, specifically explaining the state of inserting a nut-setting bolt in a bolt hole of a box section column.
FIG. 21(c) is an explanatory partially cutaway sectional side view showing an example of a method (procedure) of securing a nut using a nut-setting bolt in the process of obtaining the high strength bolted structure of FIG. 19, specifically explaining the state, after securing a nut to a box section column, of detaching a nut-setting bolt from the nut.
Figure 21B:
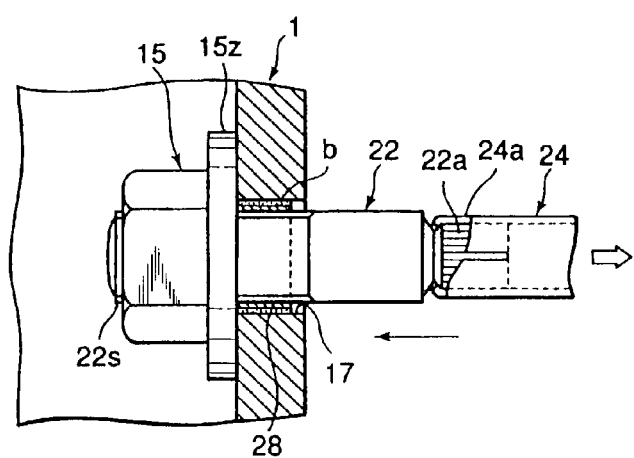
Figure 21C:
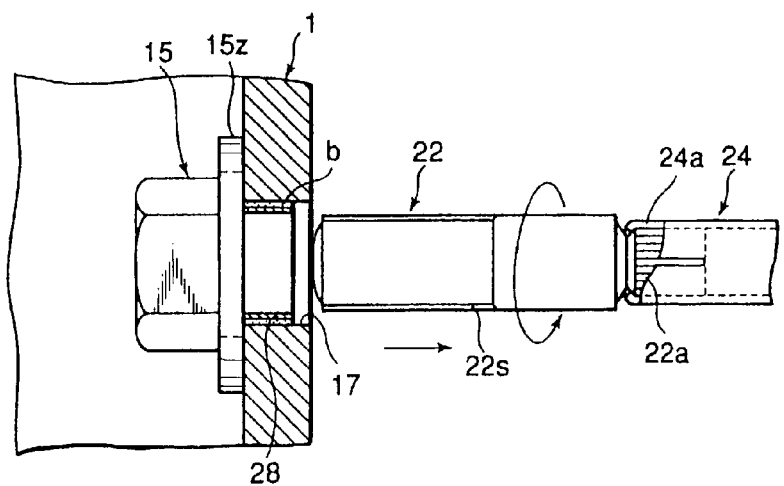

As shown in FIG. 21(*a*), the holding part 24*a* of a pullout tool 24 is inserted from the outer side of the bolt hole 17, the holding part 22*a* of the nut-setting bolt 22 is gripped and pulled up, and therefore, as shown in FIG. 21(*b*), and the washer-like part 15*z* of the nut 15 is pushed against the inner surface of the box section column 1. In that state, the outer circumferential surface of the sleeve 28 is secured by bonding by an adhesive b to the inner surface of the bolt hole 17 of the box section column 1. When sufficiently secured by bonding, as shown in FIG. 21(*c*), the holding part 22*a* of the nut-setting bolt 22 is rotated to detach the nut-setting bolt 22 from the nut 15. In this way, it is possible to secure the nut 15 to the inner side of the box section column 1.

If transporting this to the site in the state with the bonding force not sufficiently manifested etc., to prevent detachment due to impact during the transport, for example it is also possible to use a nut-setting bolt 23 having a thread 23*s* over its entire shaft as shown in FIG. 18, not detach the nut-setting bolt 23, screw a temporary holding nut 27 with the nut-setting bolt 23 from the outer side to tighten it to an extent of hand tightening, then transport it to the site.

[High Strength Bolting Method of Box Section Column and Split T-Section]

The high strength bolting method of a box section column 1 and split T-section 2 after securing the nut 15 to the inner side of the box section column 1 in the above way is generally the same as with the case of the first to third embodiments, so an explanation will be omitted.

In a bolted structure of a box section column 1 and split T-section 2 using the Torque-Shear type high strength bolt 6α of the fourth embodiment, the nut 15 is secured to the inner side of the box section column 1 by inserting the sleeve 28 of the nut 15 side into the bolt hole 17 of the box section column 1 and by bonding its outer circumferential surface. Compared with the first and second embodiments using the nut holding part, the structure is easy, and the work of securing the nut is easy. The rest of the effects are generally the same as the case of the first to third embodiments.

Fifth Embodiment

Next, a fifth embodiment of the present invention will be explained in detail with reference to FIG. 22 to FIG. 25(*c*). The fifth embodiment is the case of application of the present invention to a high strength bolted structure of a box section column 1 and split T-section 2.

Figure 22:
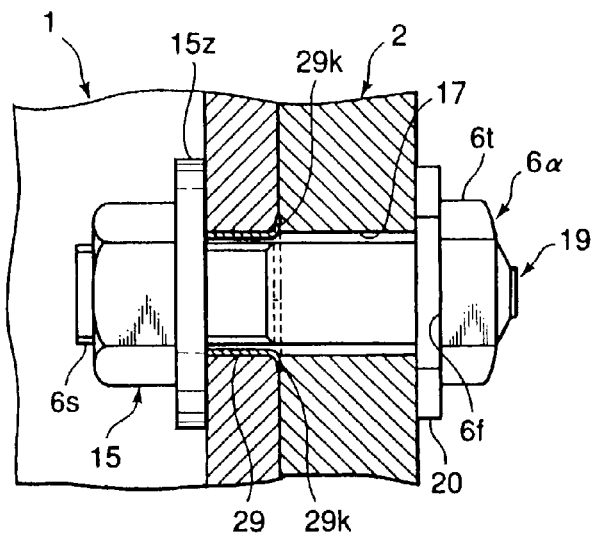
FIG. 22 is an explanatory sectional side view of the state of completion of main tightening in an example of a join structure of a box section column and split T-section by a Torque-Shear type high strength bolt in a fifth embodiment of the present invention.

FIG. 22 shows the state of completion of the bolting in an example of a high strength bolted structure of a box section column 1 and split T-section 2 according to the present invention. The fifth embodiment differs from the first to fourth embodiments in a structure of securing a nut to the inner side of the box section column 1. Detailed explanations of common portions will be omitted.

Figure 23A:
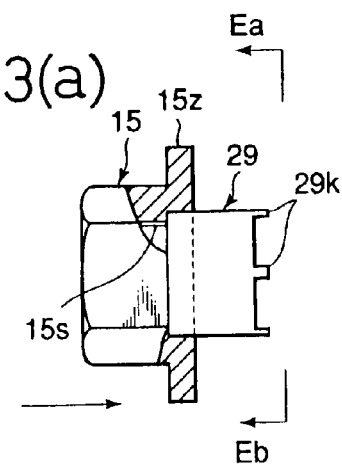
FIG. 23(a) is an explanatory partial sectional side view of an example of the structure of a sleeved nut used in FIG. 22.
Figure 23B:
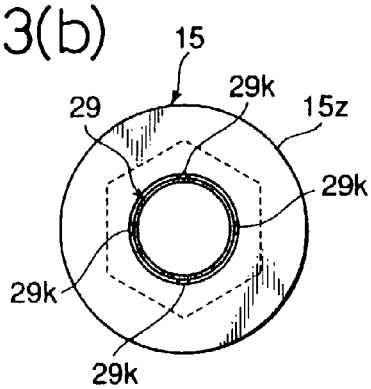
FIG. 23(b) is an explanatory view seen along the arrow Ea–Eb in FIG. 23(a).

In FIG. 22, reference numeral 15 is a nut having a female thread 15*s* secured to the inner side of the box section column 1. In the same way as in the first to fourth embodiments, it has a shape formed integrally with a washer-like part 15*z* and secures a sleeve 29 to the washer-like part 15*z* as shown in FIG. 23(*a*) and FIG. 23(*b*). The sleeve 29 is made of metal and has a base end inserted in and bonded with a hole of the washer-like part 15*z*, so has an outer diameter slightly smaller than the bolt hole 17. It is formed with a plurality of projecting parts 29*k* at the front end side.

The projections 29*k* are comprised of parts of the front end bent outward. By inserting the sleeve 29 into the bolt hole 17 of the box section column 1, then bending outward the projection 29*k* projecting to the outside of the box section column 1, the nut 15 is secured to the inner side of the box section column 1.

The sleeve 29 has a front end forming the projecting parts 29 projecting several mm, preferably 3 to 5 mm or so, from the outer surface of the box section column 1. The length of the projections 29*k* is somewhat, preferably about 1 mm, longer than the above projecting length so that the valleys between the projections 29*k* are positioned inside the box section column.

The Torque-Shear type high strength bolt 6α has a washer 20 inserted over it and is similar to the first to fourth embodiments. It is inserted into the bolt hole 17 from the outside of the split T-section 2 brought into abutment against the outside of the box section column 1, is screwed at its male thread 5*s* with the female thread 15*s* of the nut secured by to the inner side of the box section column going through the bolt hole 17 of the split T-section 2 and hole of the sleeve 29, and, in the same way as the first embodiment, is tightened at its head side by a tightening tool 21 so as to join the box section column 1 and the split T-section 2.

Figure 24:
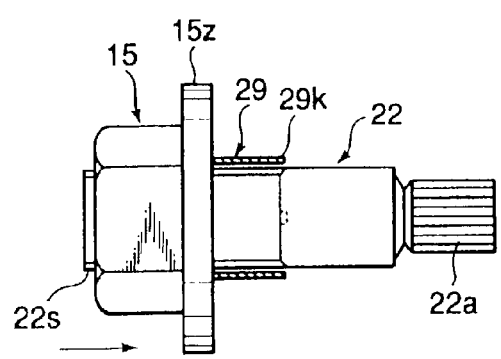
FIG. 24 is an explanatory side view of the state of screwing a nut fastened with a sleeve to a nut-setting bolt used in an example of the method of securing a nut in the process of obtaining the high strength bolting structure of FIG. 22.

The joining method for obtaining a high strength bolted structure of the box section column 1 and split T-section 2 of the fifth embodiment will be explained next with reference to FIG. 24 to FIG. 25(*c*).

[Method of Securing Nut to Inside of Box Section Column]

The method uses a system and nut-setting bolt 22 similar to those of the first to fourth embodiments. As shown in FIG. 24, the female thread 15*s* of the nut 15 formed integrally with the washer-like part 15*z* is screwed with the male thread 22*s* of the nut-setting bolt 22, and the assembly is transported to a predetermined position inside the box section column 1.

Figure 25A:
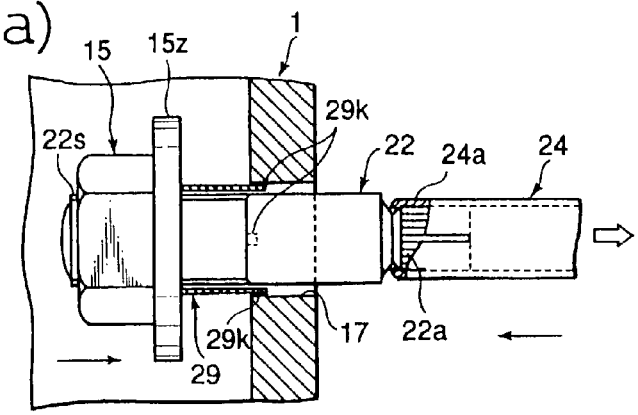
FIG. 25(a) is an explanatory partially cutaway sectional side view showing the procedure for securing a nut using a nut-setting bolt in the process of obtaining the high strength bolting structure of FIG. 22, specifically explaining the state of inserting a nut-setting bolt into a bolt hole of a box section column.
Figure 25B:
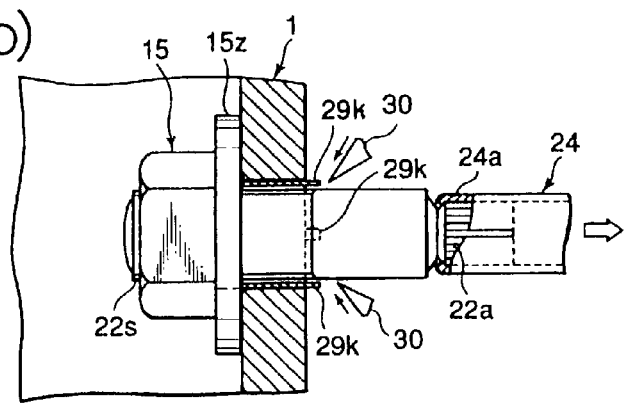
FIG. 25(b) is an explanatory partially cutaway sectional side view showing the procedure for securing a nut using a nut-setting bolt in the process of obtaining the high strength bolting structure of FIG. 22, specifically explaining the state of pulling a nut-setting bolt to start bending outward by a tool the projecting parts of a sleeve projecting from the outer surface of a box section column.
Figure 25C:
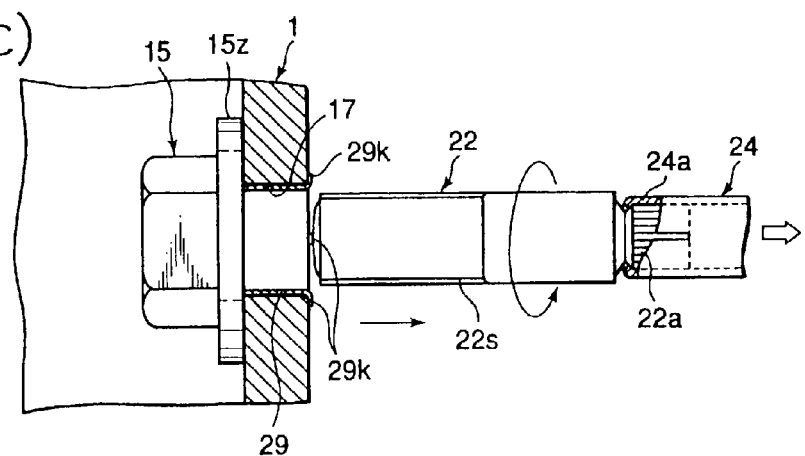
FIG. 25(c) is an explanatory partially cutaway sectional side view showing the procedure for securing a nut using a nut-setting bolt in the process of obtaining the high strength bolting structure of FIG. 22, specifically explaining the state of bending outward and securing by bending the projecting parts of the nut side sleeve to the outer surface of the box section column, then detaching the nut-setting bolt from the nut.

As shown in FIG. 25(*a*), the holding part 24*a* of a pullout tool 24 is inserted from the outer side of the bolt hole 17 of the box section column 1, the holding part 22*a* of the nut-setting bolt 22 is gripped and pulled up, and therefore, as shown in FIG. 25(*b*), the seat face of the washer-like part 15*z* of the nut 15 is pushed against the inner surface of the box section column 1. In that state, the projecting parts 29*k* of the front end of the sleeve 29 projecting to the outside of the box section column 1 are suitably bent outward using a suitable bending tool 30 to fix and secure the nut holding part to the outer surface of the box section column 1. After being fixed and secured, as shown in FIG. 25(*c*), the holding part 22*a* of the nut-setting bolt 22 is rotated to detach the nut-setting bolt 22 from nut 15. In this way, it is possible to secure the nut 15 to the inner side of the box section column 1.

[High Strength Bolting Method of Box Section Column and Split T-Section]

The high strength bolting method of a box section column 1 and split T-section 2 after securing the nut 15 to the inner side of the box section column 1 in the above way is generally the same as with the case of the first to fourth embodiments, so an explanation will be omitted.

In a bolted structure of a box section column 1 and split T-section 2 using the Torque-Shear type high strength bolt 6α of the fifth embodiment, since the nut 15 is secured to the inner side of the box section column 1 by inserting the sleeve 29 of the nut 15 side into the bolt hole 17 of the box section column 1 and is fixed and secured by bending outward the projecting parts 29k, there are less bonding steps and the work of securing the nut is easy. The rest of the effects are basically the same as the case of the first to fourth embodiments.

Sixth Embodiment

Next, a sixth embodiment of the present invention will be explained in detail with reference to FIG. 26 to FIG. 29(c). The sixth embodiment is a case of application of the present invention to a high strength bolted structure of a box section column 1 and split T-section 2.

Figure 26:
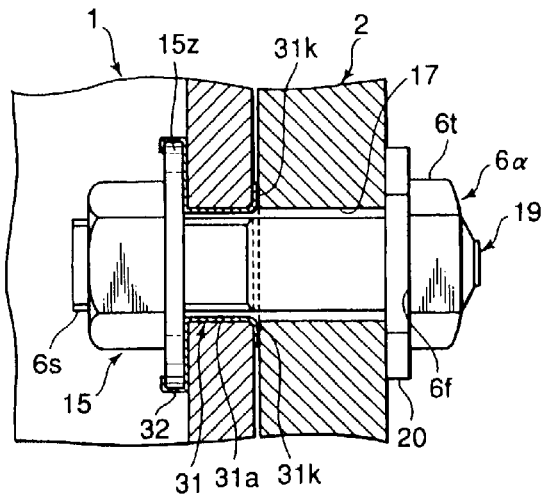
FIG. 26 is an explanatory sectional side view of the state of completion of main tightening in an example of a join structure of a box section column and split T-section by a Torque-Shear type high strength bolt in a sixth embodiment of the present invention.

FIG. 26 shows the state of completion of the join by a Torque-Shear type high strength bolt 6α in an example of a high strength bolted structure of a box section column 1 and split T-section 2 according to the present invention. The sixth embodiment differs from the first to fifth embodiments in a structure of securing a nut to the inner side of the box section column 1. Detailed explanations of common portions will be omitted.

Figure 27A:
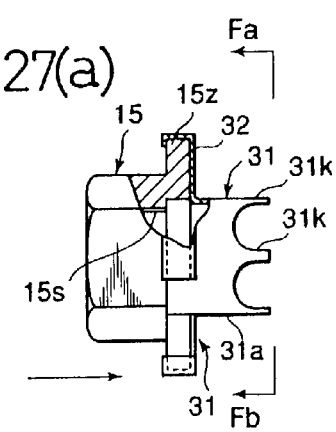
FIG. 27(a) is an explanatory partially cutaway sectional side view of an example of the structures of the nut and nut holding part used in FIG. 26.
Figure 27B:
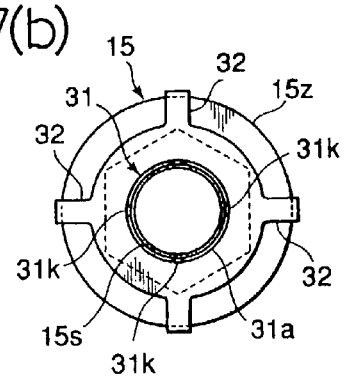
FIG. 27(b) is an explanatory view seen along the arrow Fa–Fb in FIG. 27(a).

In FIG. 26, reference numeral 15 is a nut having a female thread 15s secured to the inner side of the box section column 1. It has a shape formed integrally with a washer-like part and engages engagement parts of a plurality of engagement legs 32 of a nut holding part 31 with the outer circumference of the washer-like part 15z as shown in FIG. 27(a) and FIG. 27(b).

The nut holding part 31 is made of metal and is formed with a plurality of projecting parts 31k at the front end side of a sleeve part 31a having an outer diameter slightly smaller than the bolt hole 17. The engagement legs 32 easily elastically deform so that the engagement parts can be easily attached to and detached from the outer circumference of the washer-like part 15z of the nut 15. The engagement legs 32 have join surfaces with the inner side of the box section column 1 and the nut (washer-like part), so preferably have areas enabling a sufficient frictional force to be obtained and are treated to give a high friction grip on their join surfaces.

Further, the projecting parts 31k are comprised of parts of the front end bent outward. By inserting the sleeve part 31a into the bolt hole 17 of the box section column 1, then bending outward the projections 31k projecting to the outside of the box section column 1, the nut 15 is secured to the inner side of the box section column 1.

The Torque-Shear type high strength bolt 6α has a washer 20 inserted over it and is similar to the first to fifth embodiments. It is inserted into the bolt hole 17 from the outside of the split T-section 2 brought into abutment against the outside of the box section column 1, is screwed at its male thread 6s with the female thread 15s of the nut secured to the inner side of the box section column 1 going through the bolt hole 17 of the split T-section 2 and hole of the sleeve part 31a of the nut holding part 31, and, in the same way as the first embodiment, is tightened at its head side by a tightening tool 21 so as to join the box section column 1 and the split T-section 2.

Figure 28:
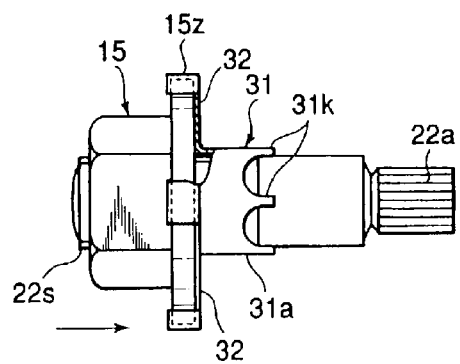
FIG. 28 is an explanatory partially cutaway sectional side view of the state of screwing a nut fastened with a nut holding part to a nut-setting bolt used in an example of the method of securing a nut in the process of obtaining the high strength bolted structure of FIG. 26.

The joining method for obtaining a high strength bolted structure of the box section column 1 and split T-section 2 of the sixth embodiment will be explained next with reference to FIG. 28 to FIG. 29(c).

[Method of Securing Nut to Inside of Box Section Column]

The method uses a system and nut-setting bolt 22 similar to those of the first to fifth embodiments. As shown in FIG. 28, the female thread 15s of the nut 15 with the engagement parts of the plurality of engagement legs 32 engaged with the outer circumference of the washer-like part 15z is screwed with the male thread 22s of the nut-setting bolt 22, and the assembly is transported to a predetermined position inside the box section column 1.

Figure 29A:
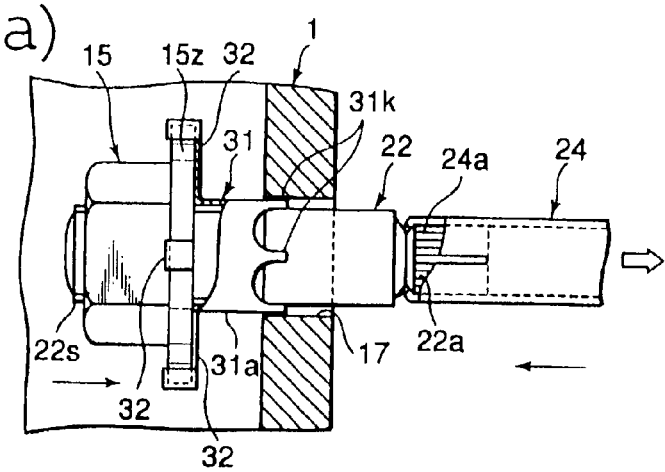
FIG. 29(a) is an explanatory partially cutaway sectional side view showing the procedure for securing a nut using a nut-setting bolt in the process of obtaining the high strength bolting structure of FIG. 26, specifically explaining the state of inserting a nut-setting bolt into a bolt hole of a box section column.
Figure 29B:
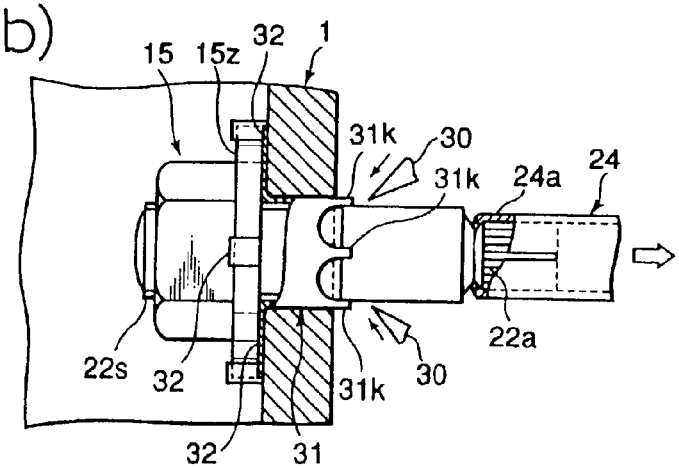
FIG. 29(b) is an explanatory partially cutaway sectional side view showing the procedure for securing a nut using a nut-setting bolt in the process of obtaining the high strength bolting structure of FIG. 26, specifically explaining the state of pulling a nut-setting bolt to start bending outward by a tool a projecting parts of a nut holding part projecting from an outer surface of a box section column.
Figure 29C:
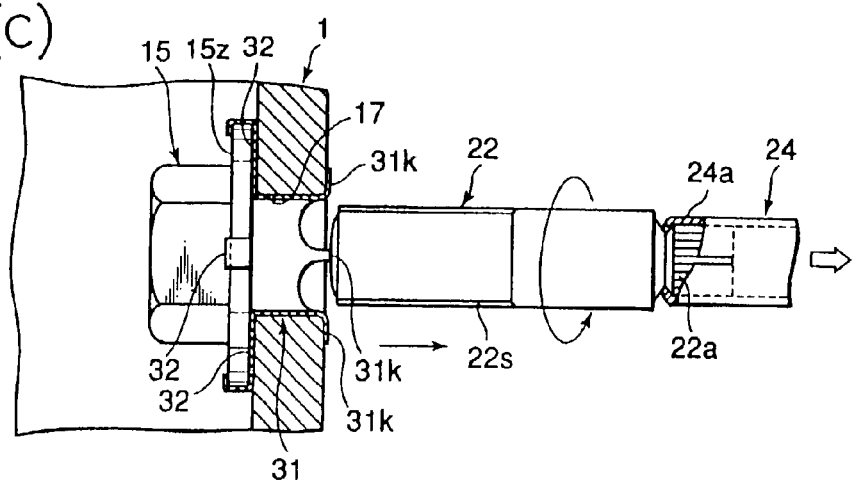
FIG. 29(c) is an explanatory partially cutaway sectional side view showing the procedure for securing a nut using a nut-setting bolt in the process of obtaining the high strength bolting structure of FIG. 26, specifically explaining the state of bending outward and securing by bending the projecting parts of the nut side sleeve to the outer surface of the box section column, then detaching the nut-setting bolt from the nut.

As shown in FIG. 29(a), the holding part 24a of a pullout tool 24 is inserted from the outer side of the bolt hole 17, the holding part 22a of the nut-setting bolt 22 is gripped and pulled up, and therefore, as shown in FIG. 29(b), the engagement legs 32 of the nut holding part 31 are pushed against the inner surface of the box section column 1. In that state, the projections 31k of the nut holding part 31 projecting to the outside of the box section column 1 are suitably bent outward using a bending tool 30 to fix and secure the nut holding part to the outer surface of the box section column 1. After being fixed and secured, as shown in FIG. 29(c), the holding part 22a of the nut-setting bolt 22 is rotated to detach the nut-setting bolt 22 is rotated to from the nut 15. In this way, it is possible to secure the nut 15 to the inner side of the box section column 1.

[High Strength Bolting Method of Box Section Column and Split T-Section]

The high strength bolting method of a box section column 1 and split T-section 2 after securing the nut 15 to the inner side of the box section column 1 in the above way is generally the same as with the case of the first to fifth embodiments, so an explanation will be omitted.

In a bolted structure of a box section column 1 and split T-section 2 using the Torque-Shear type high strength bolt 6α of the sixth embodiment, since the nut 15 is secured to the inner side of the box section column 1 by using the nut holding part 31 comprised of the engagement legs 32, sleeve part 31a, and projections 31k, engaging the engagement legs 32 with the outer circumference of the washer-like part 15z of the nut 15, and bending outward the projections 31k to fix and secure them to the outside of the box section column 1, it is possible to easily attach and detach the nut holding part 31 to and from the nut 15 side, there is no need for bonding work compared with the second, third, and fourth embodiments using the adhesive b, and therefore the work of securing the nut also becomes simple. The rest of the effects are basically the same as the case of the first to fifth embodiments.

Seventh Embodiment

Next, a seventh embodiment of the present invention will be explained in detail with reference to FIG. 30 to FIG. 34(c). The seventh embodiment differs from the first to sixth embodiments in the nut and washer structure and the method (structure) of securing the nut.

Figure 30:
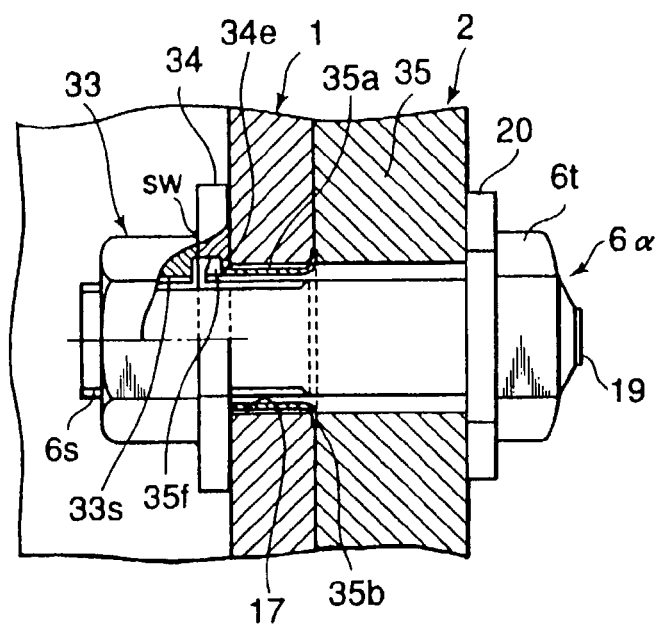
FIG. 30 is an explanatory sectional side view of the state of completion of main tightening in an example of a join structure of a box section column and split T-section by a Torque-Shear type high strength bolt in a seventh embodiment of the present invention.
Figure 31A:
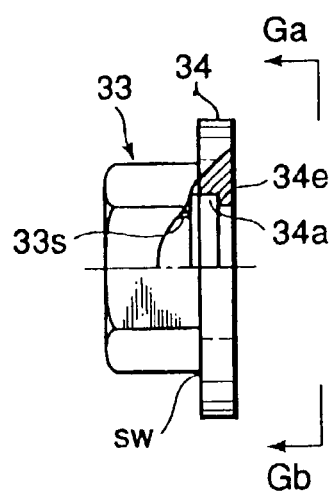
FIG. 31(a) is an explanatory partially cutaway sectional side view of an example of the structure of a nut used in FIG. 30.
Figure 31B:
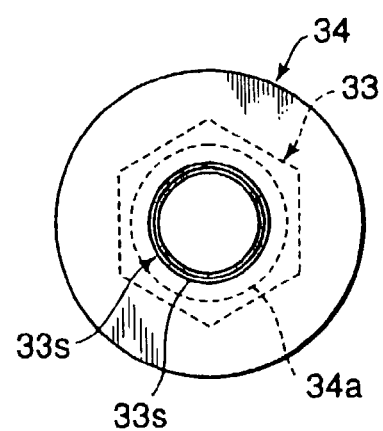
FIG. 31(b) is an explanatory view seen along the arrow Ga–Gb in FIG. 31(a).

FIG. 30 shows the state of completion of the join by a Torque-Shear type high strength bolt 6α in an example of a high strength bolted structure of a box section column 1 and split T-section 2 according to the present invention. Detailed explanations of the portions common with the first embodiment are omitted. In FIG. 30, reference numeral 33 is a nut secured to the inner side of the box section column 1. As shown in FIG. 31(a) and FIG. 31(b), it has a female thread 33s and has a washer 34 secured to it by welding (for example, spot welding sw).

Figure 32A:
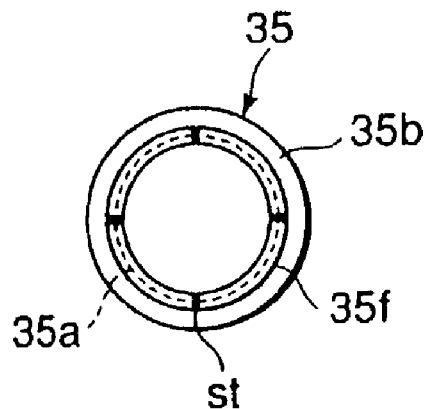
FIG. 32(a) is an explanatory front view of an example of the structure of a nut holding part used in FIG. 30.
Figure 32B:
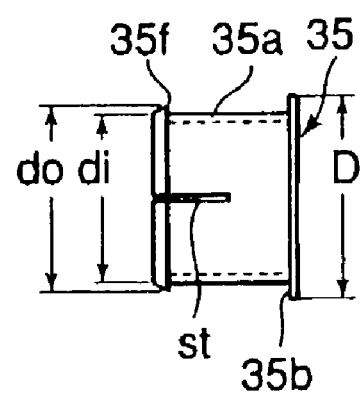
FIG. 32(b) is an explanatory side view of FIG. 32(a).

The washer 34, as shown in FIG. 31(a) and FIG. 31(b), is formed with an engagement rim 34e at the split T-section 2 side of an engagement hole 34a. This engagement rim 34e has an inner diameter the same as or slightly smaller than the bolt hole 17 of the box section column 1 and is designed to engage with an engagement hook 35*f* of a nut holding part 35 inserted into the bolt hole 17 from the outer side of the box section column 1. This nut holding part 35 is made of plastic. As shown in FIG. 32(*a*) and FIG. 32(*b*), it is comprised of a sleeve part 35*a* with slits (or notches) st and a flange part 35*b* and is formed with an engagement hook 35*f* at the front end of its sleeve part 35*a*. The outer diameter do and inner diameter di of the engagement hook 35*f* can be elastically expanded or compressed due to the effects of the slits st.

The male thread 6*s* of the Torque-Shear type high strength bolt 6α can be easily inserted into the sleeve part 35*a*. Here, the flange 35*b* engages with the outer surface of the box section column 1. Its outer diameter is normally somewhat larger, preferably about 1 to 2 mm larger, than the diameter of the bolt hole, but when its front and back surfaces become joining surfaces, it is effective to make the flange 35*b* of metal and make the outer diameter D about two to three times the shaft diameter of the Torque-Shear type high strength bolt 6α so as to stabilize the joining surfaces.

The sleeve 35*a* of the nut holding part 35 is inserted from the outside of the box section column 1, engaged at its flange 35*b* with the outer surface of the box section column 1, and has the engagement hook 35*f* of the front end of the sleeve 35*a* pushed into and fixed with the engagement rim 34*e* of the engagement hole 34*a* of the washer 34 abutting against the inner side of the box section column 1, whereby the nut 33 secured to the washer 34 is reliably secured to the inner side of the box section column 1.

The Torque-Shear type high strength bolt 6α has a washer 20 inserted over it and is similar to the first to sixth embodiments. It is inserted into the bolt hole 17 from the outside of the split T-section 2 brought into abutment against the outside of the box section column 1, is screwed at its male thread 6*s* with the female thread 33*s* of the nut 33 secured to the inner side of the box section column 1 going through the bolt hole 17 of the split T-section 2, inside of the sleeve part 35*a* of the nut holding part 35, and engagement hole 34*a* of the washer 34, whereby the box section column 1 and the split T-section 2 are reliably joined. Note that the nut holding part 35 is not necessary in the state after completion of the join between the box section column 1 and the split T-section 2, but does not pose a problem even if left as it is.

Figure 33:
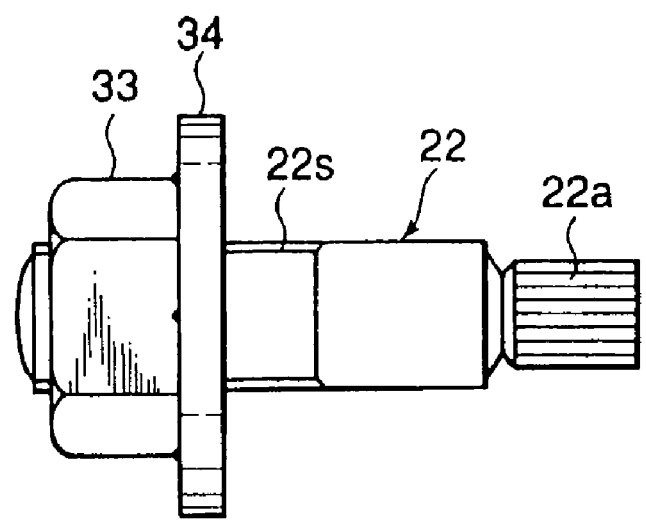
FIG. 33 is an explanatory side view of the state of screwing a nut fastened with a nut holding part to a nut-setting bolt used in the example of the method of securing a nut in the process of obtaining the high strength bolted structure of FIG. 30.
Figure 34A:
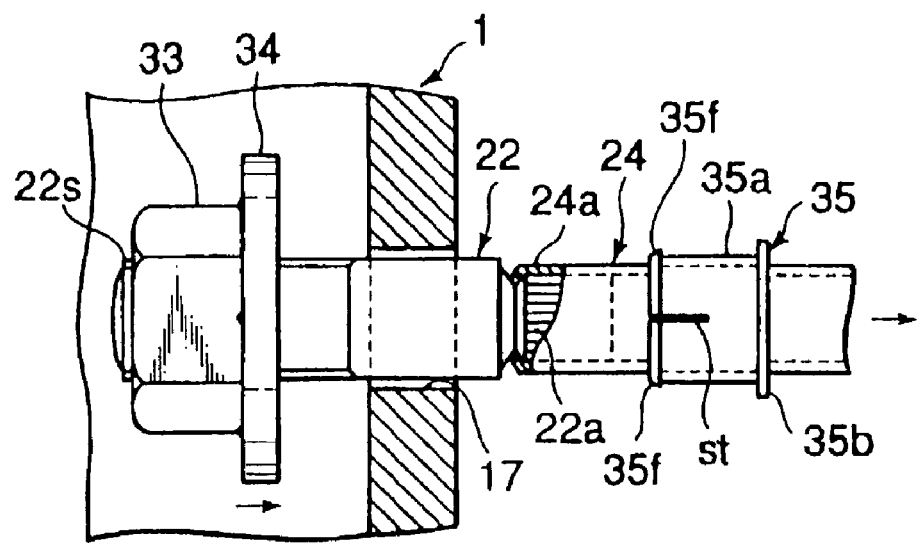
FIG. 34(a) is an explanatory partially cutaway sectional side view showing the procedure for securing a nut using a nut-setting bolt in the process of obtaining the high strength bolting structure of FIG. 30, specifically explaining the state of inserting a nut-setting bolt into a bolt hole of a box section column.
Figure 34B:
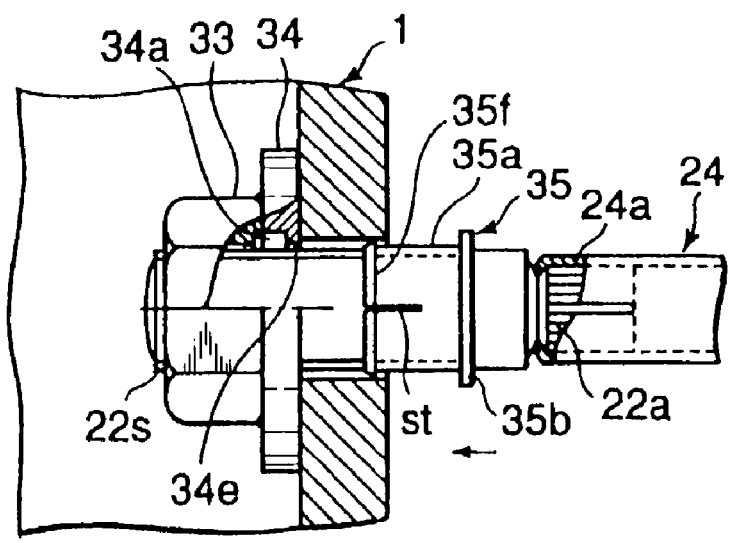
FIG. 34(b) is an explanatory partially cutaway sectional side view showing the procedure for securing a nut using a nut-setting bolt in the process of obtaining the high strength bolting structure of FIG. 30, specifically explaining the state of pulling a nut-setting bolt to insert a nut holding part passed through the nut-setting bolt projecting from the outer surface of a box section column into the bolt hole.
Figure 34C:
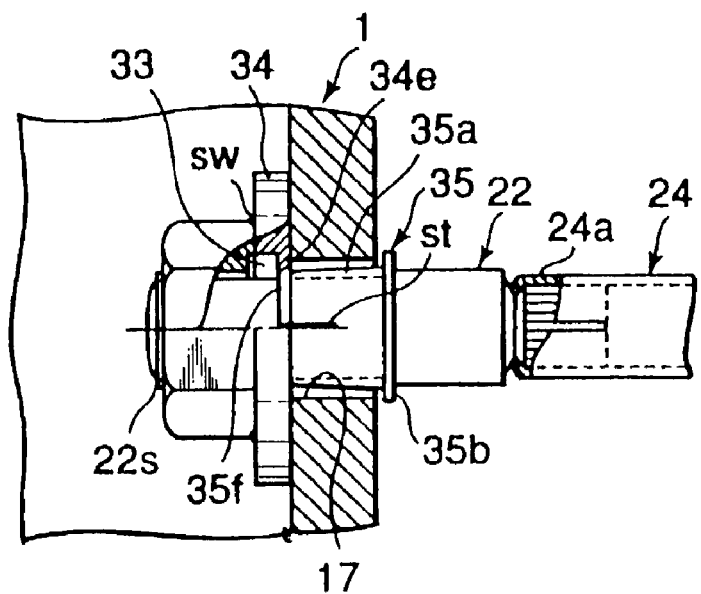
FIG. 34(c) is an explanatory partially cutaway sectional side view showing the procedure for securing a nut using a nut-setting bolt in the process of obtaining the high strength bolting structure of FIG. 30, specifically explaining the state of an engagement hook of the nut holding part passed over an engagement rim of a washer.
Figure 34D:
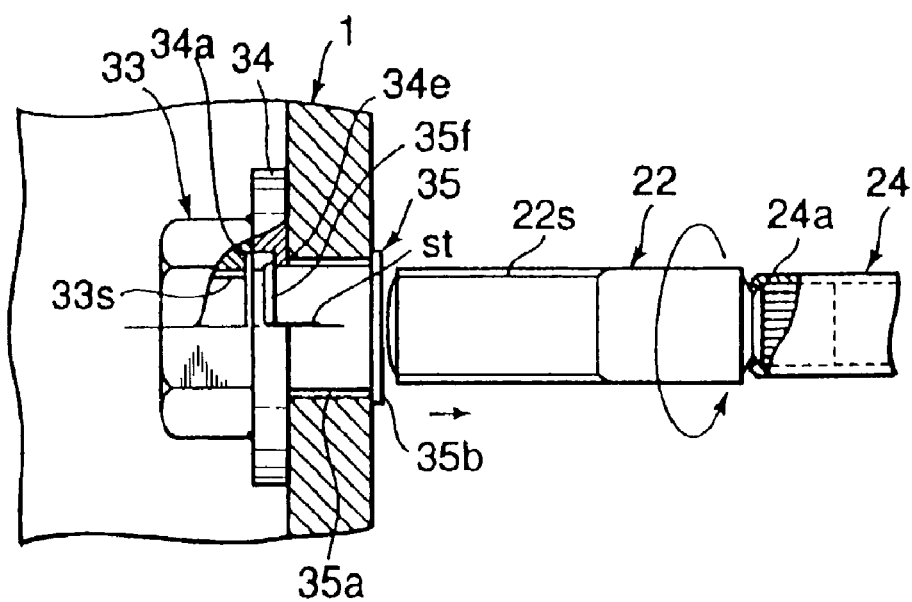
FIG. 34(d) is an explanatory partially cutaway sectional side view showing the procedure for securing a nut using a nut-setting bolt in the process of obtaining the high strength bolting structure of FIG. 30, specifically explaining the state, after securing a nut to a box section column, of detaching the nut from the nut-setting bolt.

The joining method for obtaining a high strength bolted structure of the box section column 1 and split T-section 2 of the seventh embodiment will be explained next with reference to FIG. 33 to FIG. 34(*d*).

[Method of Securing Nut to Inside of Box Section Column]

The method uses a system and nut-setting bolt 22 similar to those of the first to sixth embodiments. As shown in FIG. 33, the female thread 33*s* of the nut 33 with the washer 34 welded to its seat face is screwed with the male thread 22*s* of the nut-setting bolt 22, and the assembly is transported to a predetermined position inside the box section column 1.

As shown in FIG. 34(*a*), the holding part 24*a* of a pullout tool 24 inserted through the nut holding part 35 in advance is inserted from the outer side of the bolt hole 17 of the box section column 1, the holding part 22*a* of the nut-setting bolt 22 is gripped and pulled up, and therefore, as shown in FIG. 34(*b*), the sleeve part 35*a* of the nut holding part 35 is inserted into the bolt hole 17 of the box section column 1 and the seat face of the washer 34 securing the nut 33 is pushed against the inner surface of the box section column 1. In that state, as shown in FIG. 34(*c*), the sleeve 35*a* of the nut holding part 35 is pushed in.

When the sleeve part 35*a* is pushed in, due to the effect of the slits st, the engagement hook 35 contracts in outer diameter and passes over the engagement rim of the washer 34. At the same time as it passes over it, as shown in FIG. 34(*d*), the engagement hook 35*f* expands in outer diameter (is restored) and engages with the engagement rim 34*e* of the engagement hole 34*a* of the washer 34, whereby the nut 33 is reliably secured to the inner side of the box section column 1. After the nut 33 is secured, the nut-setting bolt 22 is rotated to remove it from the nut 33.

[High Strength Bolting Method of Box Section Column and Split T-Section]

The high strength bolting method of a box section column 1 and split T-section 2 after securing the nut 33 to the inner side of the box section column 1 in the above way is generally the same as with the case of the first to sixth embodiments, so an explanation will be omitted.

In a bolted structure of a box section column 1 and split T-section 2 using the Torque-Shear type high strength bolt 6α of the seventh embodiment, compared with the case of the first embodiment, the washer has to be fabricated, the nut 33 and the washer 34 have to be secured, and the nut holding part has to be fabricated, but the work of securing the nut is simple. The effects obtained by securing the nut to the inside of the box section column are generally the same as in the first to sixth embodiments.

Further, in the above second, fourth, and fifth embodiments, a sleeve was fit and bonded as a nut holding part with the nut (washer-like part), but it is also possible to form slits in the base part of the sleeve for being pushed into the nut (washer-like part) to make the diameter of the slits elastically expandable or contractible to secure the sleeve by press-fitting. In this case, it is also possible to jointly use bonding. Alternatively, it may be screwed in as in the case of the first embodiment.

The high strength bolting structure and method of securing a nut of the present invention are not limited to the above embodiments. For example, the above embodiments were of cases of use of rectangular section box section members as columns and high strength bolting split T-sections as joining hardware to the columns, but the present invention may also be applied to the case of for example using circular steel tubes (box section members) as the columns and high strength bolting split T-sections as joining hardware. In this case, this may be dealt with by forming as curves the seat faces of the washers (washer-like parts) and joining surfaces of the split T-sections with the box section columns. Further, it is possible to apply the present invention to the case of using box section members as beams and high strength bolting them with joining hardware and to apply it to high strength bolting of box section members and joining hardware other than split T-sections or beams.

The work of securing the nuts for obtaining the bolted structure of a box section column and split T-section in the above embodiments is basically performed at the factory, but can also be performed before construction at the construction site. Further, the work of tightening the bolts may be completed at the factory or may be performed before construction or at the time of construction at the construction site.

Further, in the bolted structures of a box section column and split T-section in the above embodiments, as the method of securing the nuts to the insides of the box section columns, the method of securing the nuts using the bolt transport system, pullout tool, and nut-setting bolt described in Japanese Unexamined Patent Publication (Kokai) No. 2000-213070 was described as an example, but it is also possible to use other methods for securing nuts.

Further, as the high strength bolt, the invention is not limited to the Torque-Shear type high strength bolt $6\alpha$. It is also possible to use another high strength bolt tightened at the bolt head side. In this case, use of the washer 20 is not essential. Further, the conditions for forming the head of the high strength bolt, the conditions for forming the pintail and breaking groove (breakneck), the conditions for forming the threads, the conditions for forming the washer at the head side, the conditions for forming the nut and the washer, the structure for holding the nut (including the means of securing the nut and sleeve and materials), the high friction grip processing of the joining surfaces, etc. may be changed in accordance with the objects to be joined, the joined locations, the material strength, design strength, etc.

Next, the Torque-Shear type high strength bolt and joining method using the same of the present invention will be explained.

The Torque-Shear type high strength bolt and bolting method using the same of the present invention relate to a high strength bolt having a male thread for screwing with a female thread formed in a nut or steel member and enabling tightening by engagement of a tightening tool to its head side, specifically a Torque-Shear type high strength bolt formed with a pintail for torque control at the front end of its head and formed with a breakneck comprised by a breaking groove between the head and pintail (the Torque-Shear type high strength bolt of the present invention requires a washer at the bolt head side, but when used as a tap bolt, the nut and washer at the male thread side are not essential), and is different from the conventional Torque-Shear type high strength bolt formed with a pintail at the front end at the opposite side of the head. It is mainly used as a through bolt (meaning a bolt for being passed through superposed steel members to be joined, inserted through a washer at its male thread, and screwed with a nut at its male thread. This is hereinafter referred to as a "through bolt") or as a tap bolt (meaning a bolt where the male thread of the bolt is directly screwed with the steel members to be joined. The bolt may be passed through or not be passed through the superposed steel members to be joined. This is hereinafter referred to as a "tap bolt").

Figure 38C:
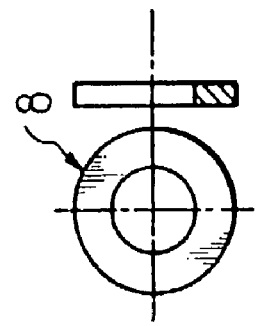
FIG. 38(*a*) is an explanatory view of a bolt of a conventional Torque-Shear type high strength bolt set.
Figure 38B:
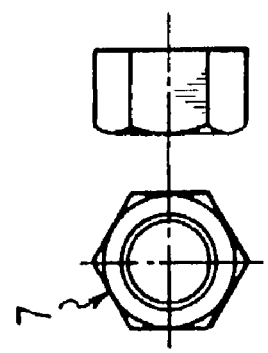
Figure 38A:
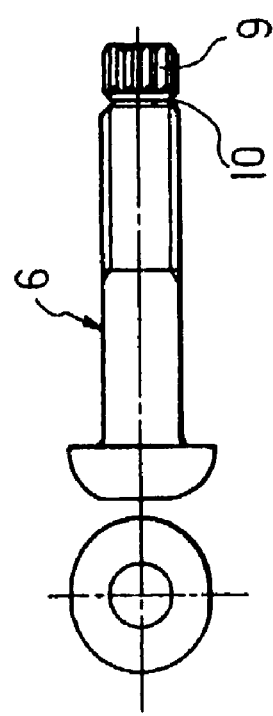

The Torque-Shear type high strength bolt of the present invention exhibits a particularly remarkable effect when used when the nut for screwing with the male thread is at the inner side of a box section member such as a rectangular steel tube or when a nut is tightened at the inside at a join location in a narrow place, but even if the nut can be tightened at the outside, it can be used in exactly the same way as a conventional Torque-Shear type high strength bolt shown in FIG. 38(a) to FIG. 38(c).

The Torque-Shear type high strength bolt of the present invention is used when constructing a steel structure building where at least F8T defined by the JIS, that is, a tensile strength of at least 800 N/mm², is demanded. For example, it is mainly used in a bolted structure between a rectangular steel tube column and H-section beam which uses a rectangular steel tube as a box section member and attaches an H-section beam to this column through a split T-section or end plate, fish plate, or other joining hardware or a high strength bolted structure at a place where tightening of the nut is difficult at the time of construction.

The Torque-Shear type high strength bolt of the present invention is tightened at its head side using a tightening tool utilizing a basic principle similar to that of a known tightening tool comprised of an inner sleeve and outer sleeve operating in association. Note that the tightening tool used in the present invention is provided with a mechanism engaging the inner sleeve with the pintail and the outer sleeve with the washer, gripping and rotating the pintail, and breaking the breakneck of the pintail by the rotational torque obtained as a reaction force of the washer with a polygonal outer circumferential shape engaged with the outer sleeve and is different from the conventional one.

By doing this, it is possible to grip the pintail by the inner sleeve of this tightening tool and cause the breakneck of the breaking groove of the pintail to break at a certain breaking torque due to the rotational torque obtained as a reaction force of the washer through the outer sleeve so as to easily control the tension introduced to the bolt and thereby realize a stable bolted structure.

In the bolted structure using the Torque-Shear type high strength bolt of the present invention, the projecting height due to the head and washer at the outer surface of the structure is made extremely low, the obstacles at the time of providing a fire-resistant covering or finishing work are eased, and the drop in the aesthetic appearance in the case of a naked frame is eased. On top of this, for example, in a join structure between a rectangular steel tube column and H-section beam which uses a rectangular steel tube having a hollow rectangular (box-shaped) section as the column and attaches an H-section beam to it through joining hardware, even when securing the nut to the inner side and rotating the head side of the bolt at the outer side for tightening, it is possible to easily control the tension force introduced to the bolt.

In the past, when bolting joining hardware to a rectangular steel tube or other box section member, much use was made of a one-side bolt inserted and tightened from the outer side, but a one-side bolt is extremely expensive and has the difficulty that control of the tension introduced to the bolt is not easily possible, so attempts were made to secure the nut to the inner side of the rectangular steel tube column and insert another type of bolt from the outer side and tighten it at the outer side. The appearance of simple means as means for securing a nut to the inner side of a rectangular steel tube has made it possible to easily control the tension introduced to a bolt more inexpensively than a one-side bolt and has made it possible to realize a stable join structure.

Next, a detailed explanation will be given of the Torque-Shear type high strength bolt of the present invention and the method of bolting using the same.

The Torque-Shear type high strength bolt of the present invention is mainly one having a strength of at least 800 N/mm² easily obtained by processing and shaping by cold forging and form rolling, then heat treatment. The outer circumferential shape of the head may be round, oval, or polygonal at the time of main tightening, but if considering primary tightening, disassembly, repair (including replacement), etc., one which can be rotated by engagement with a generally used hand or power wrench or other turning tool is preferable. In this sense, a hexagonal shape can be said to be general, but a square shape or other polygonal shape, oval shape, etc. is also possible. The head size is preferably basically somewhat thinner than a conventional bolt head.

Further, the washer abutting against the seat face of the head may be formed by a standard material defined in the JIS or JSS. It is one which, when performing the main tightening using the above-mentioned tightening tool comprised of an inner sleeve and outer sleeve operating in association, functions as explained above to reliably engage with the outer sleeve and cause the breakneck of the breaking groove of the pintail to break at a certain breaking torque due to the rotational torque obtained as a reaction force of the washer and prevents the outer sleeve from rotating.

This washer is engaged with the outer sleeve of the tightening tool, so is formed to a minimum outer circumferential diameter larger than the maximum outer circumferential diameter of the bolt head so that it does not become an obstacle when rotating the pintail by the inner sleeve as explained above.

Note that this washer is designed to prevent rotation of the outer sleeve, so is heat treated to secure rigidity or in particular is roughened or otherwise processed for high friction grip or bonded at the seat face at the side of the steel member to be joined. Further, the outer circumferential shape is generally hexagonal to enable reliable engagement with the outer sleeve of the tightening tool, but may also be made a square shape or other polygonal shape.

The pintail is mainly one having a polygonal or circular sectional shape formed with a large number of axial direction grooves in its outer circumferential surface. This is because it is necessary for the outer circumferential surface to be gripped and rotated by the inner sleeve of the tightening tool, so forms an antislip function by the axial direction grooves in the outer circumferential surface. The pintail has to be gripped by the inner sleeve of the tightening tool. Basically, it is preferably made one of an outer diameter equal to the bolt shaft diameter or smaller than the shaft diameter.

The breaking groove formed between the bolt head and pintail forms a breakneck for breaking at a certain breaking torque of the rotational torque as a reaction force of the washer. It breaks in a state maintaining the original shape of the pintail when a torque acts to introduce a predetermined tension to the bolt in accordance with the bolt strength. The shape of the groove is preferably a V-groove, U-groove, etc. having a small diameter part (depth of groove) able to precisely break at a given breaking torque.

The Torque-Shear type high strength bolt of the present invention can be mass produced by for example cold forging and form rolling along with formation of the pintail and breaking groove and obtained inexpensively.

When using the Torque-Shear type high strength bolt of the present invention as a through bolt, a nut is screwed with the male thread. This nut need only have a strength of 60 to 70 percent of the strength of the bolt. Basically, it does not turn at the time of tightening, so has to be prevented from rotating when rotating the bolt head side for tightening. As a means for this, when making the nut and washer independent, the two surfaces of the washer and the seat face of the nut are roughened or otherwise processed for high friction grip or bonded. Further, when forming the washer and nut integrally, the seat face of the washer-like part is roughened or otherwise processed for high friction grip or bonded. The outer circumferential shape of the nut is generally hexagonal, but a round or another polygonal shape is also possible.

When forming the nut and washer integrally, in the sense of increasing the area of the seat face and enhancing the frictional force, it is effective to increase the area of the seat face of the washer over the area of the nut, but there is no problem even if the outer circumferential shapes of the two are the same. The washer at the nut side is sometimes omitted. It is not essential.

Note that when using a conventional Torque-Shear type high strength bolt, the general practice is the lubricate the thread and seat face of the nut so as to introduce a stable tension, but in the case of the Torque-Shear type high strength bolt of the present invention, if the nut is lubricated, the nut will co-rotate along with rotation of the bolt at the time of introducing tension to the bolt. Therefore, introduction of tension smoothly and stably will become difficult.

When using a Torque-Shear type high strength bolt of the present invention, in principle, the nut or steel member formed with the female thread for screwing with the male thread of the bolt has to be secured. Further, the washer inserted and abutted between the seat face of the bolt head and the steel member to be joined has to be made not to rotate. To enable this condition to be easily satisfied, it is effective to lubricate the seat face of the bolt head and washer and the male thread screwed with the female thread formed at the nut or steel member. This lubrication enables introduction of smooth, stable tension. Further, it is possible to prevent seizure between the male thread and female thread when applying a high tension. For this lubrication, it is possible to coat (including dipping) a lubricant, apply or interpose a sheet-like lubricant patch, or use another processing means.

Eighth Embodiment

Next, an embodiment of a Torque-Shear type high strength bolt of the present invention will be explained with reference to the drawings.

FIG. 4(a) and FIG. 4(b) show examples of the structure (shape), while FIG. 35(a), FIG. 35(b), FIG. 36(a), and FIG. 36(b) show examples of use.

In FIG. 4(a) and FIG. 4(b), reference numeral 6α is a Torque-Shear type high strength bolt of the present invention. It has a head 6t, a shaft 6g, and a male thread 6s for screwing with a female thread (explained later) formed in a nut to be secured or steel member. The head 6t is formed integrally with a pintail 18 having antislip serrations 18c on its outer circumferential surface. At the outer circumference of the boundary part between the pintail 18 and the head 6t is formed a torque control breakneck 19 comprised of a V-shaped breaking groove. The breakneck 19 is designed to break when a predetermined torque acts on the breakneck 19 during tightening. By introducing a predetermined torque, it is possible to control the tension introduced to the high strength bolt 6α.

Reference numeral 20 is a washer with a polygonal outer circumferential shape. It is inserted and abutted against the seat face 6f of the bolt head 6t. The frictional force with the steel member to be joined (not shown) is used for generating the breaking torque.

Figure 35A:
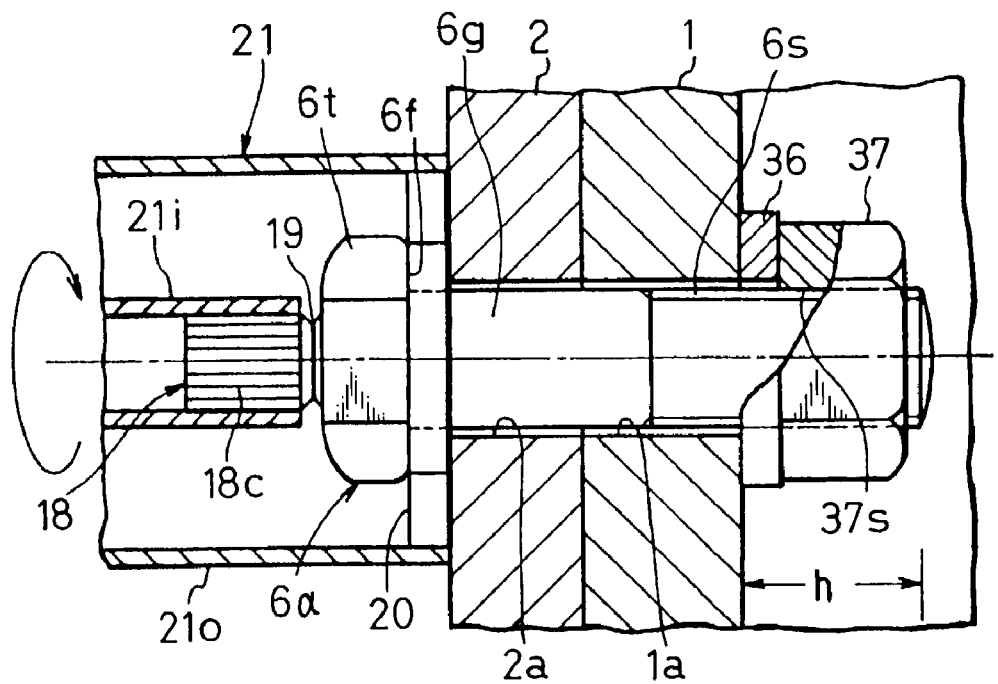
FIG. 35(a) is an explanatory sectional side view showing an example of use of the Torque-Shear type high strength bolt of the present invention and showing the state immediately before completion of tightening at the bolted structure of a rectangular steel tube column and joining hardware using it as a through bolt.
Figure 35B:
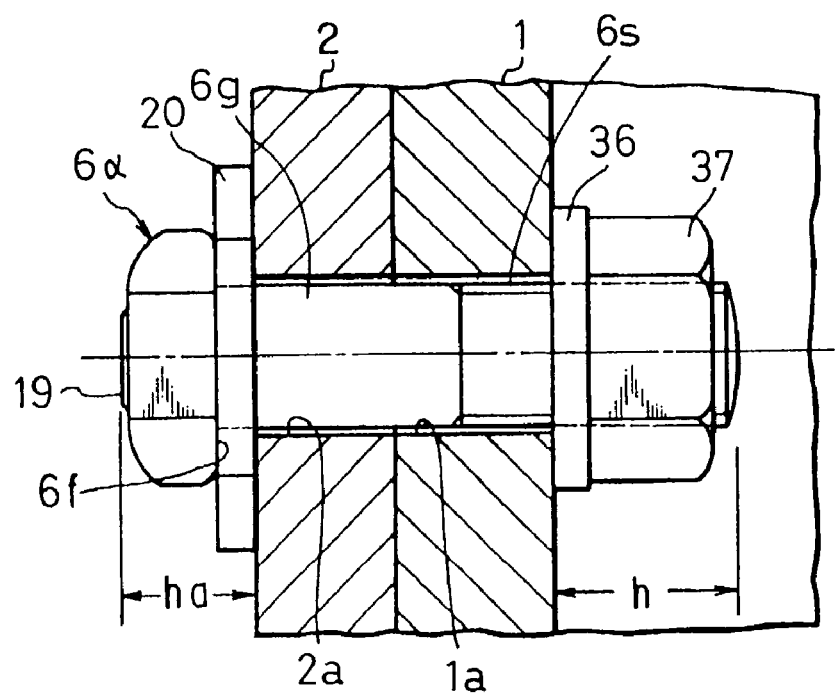
FIG. 35(b) is an explanatory sectional side view showing the state of completion of tightening of FIG. 35(a).
Figure 36A:
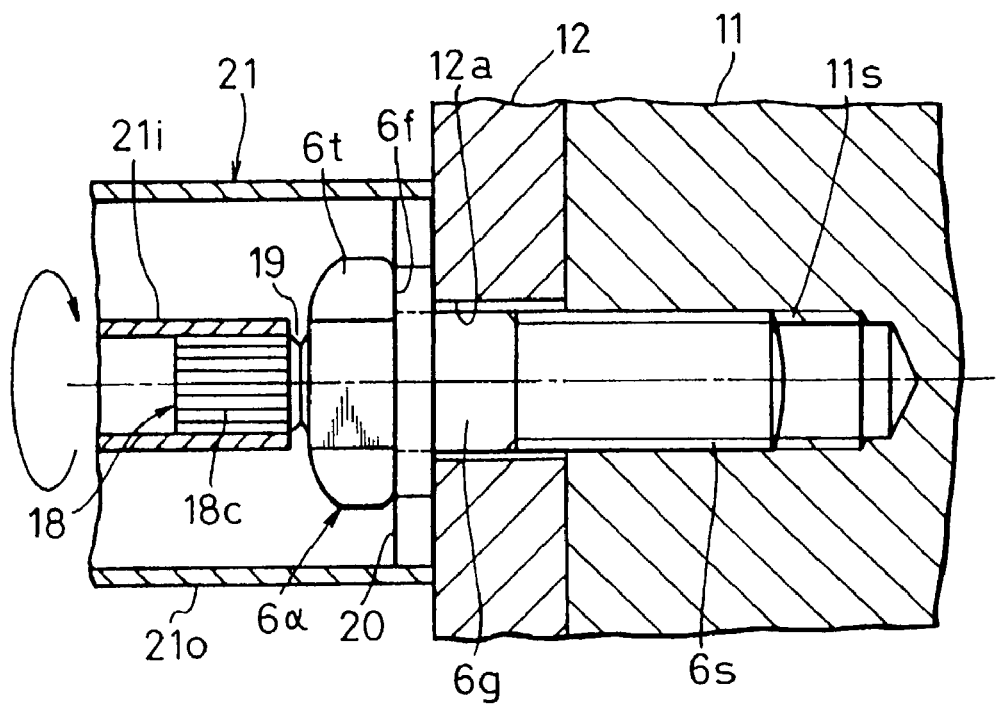
FIG. 36(a) is an explanatory sectional side view showing an other example of use of the Torque-Shear type high strength bolt of the present invention and showing the state immediately before completion of tightening at the bolted structure of one steel member and another steel member using it as a tap bolt FIG. 36(*b*) is an explanatory sectional side view of the state of completion of tightening in FIG. 36(*a*).
Figure 36B:
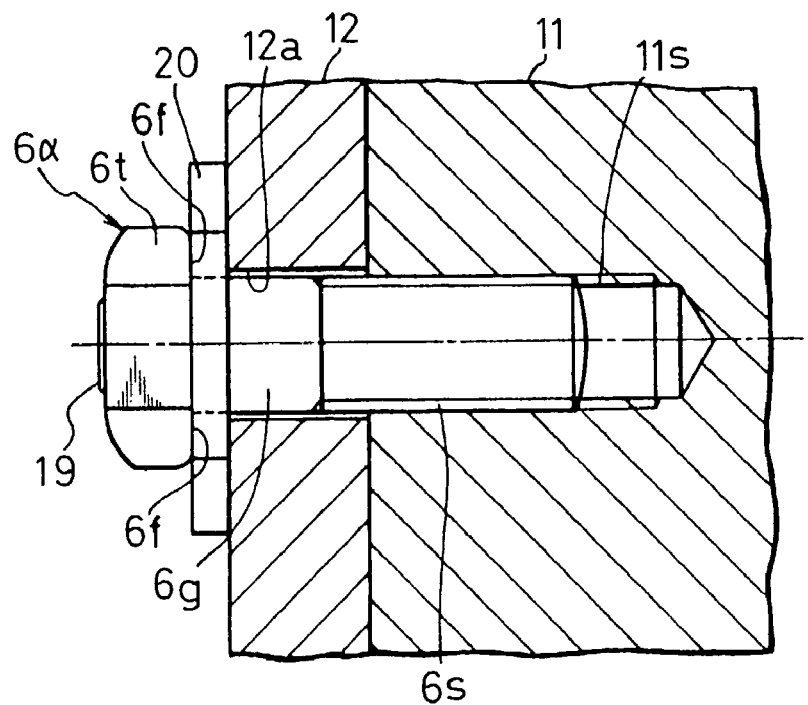
Figure 37:
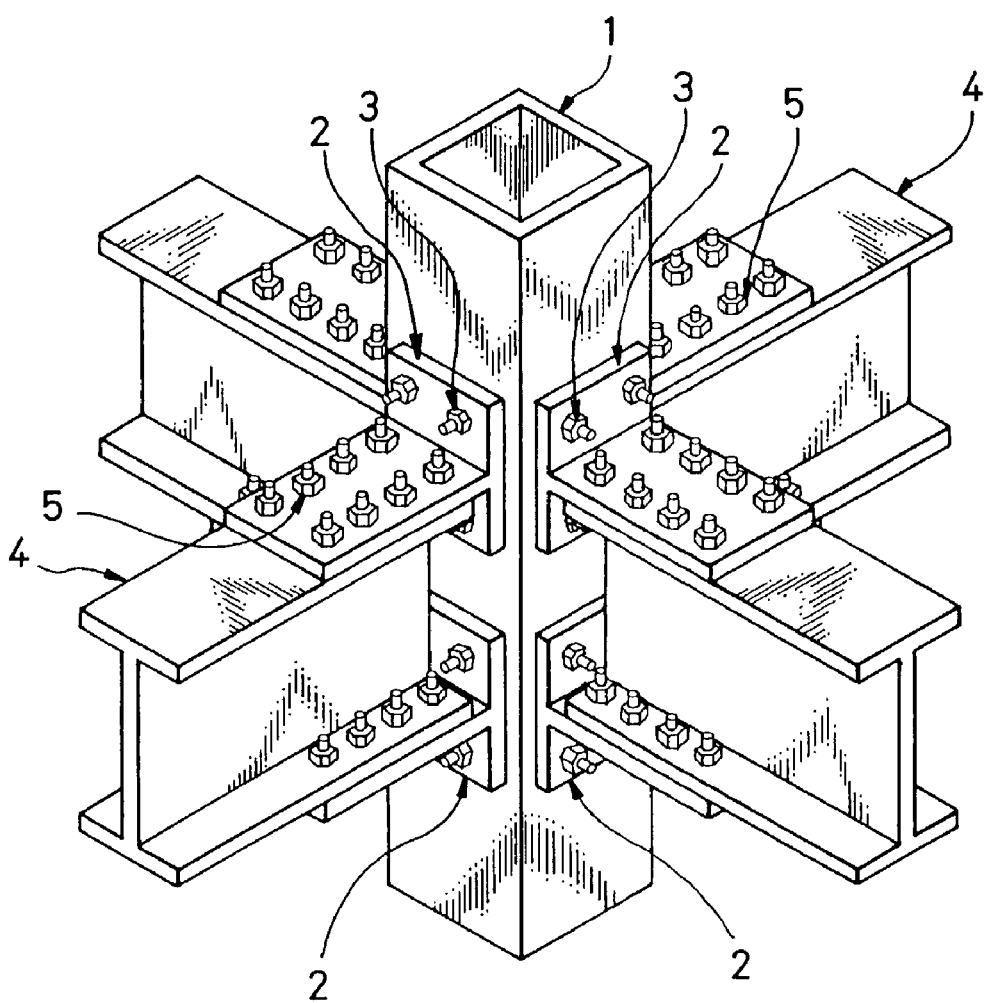
FIG. 37 is an explanatory perspective view of an example of a conventional high strength bolted structure of a box section column and H-section beam.

The Torque-Shear type high strength bolt 6α of the present invention has a structure predicated on its head 6t being rotated for tightening by a tightening tool (details not shown) 21 such as shown in FIG. 35(a) comprised of an inner sleeve 21i and an outer sleeve 21o operating in association. At the time of tightening, the frictional force between the washer 20 inserted and abutted at the seat face 6f of the head 6t and the steel member to be joined is used for generating the breaking torque.

To more stably secure the frictional force for realizing achieving this effect, the seat face of the washer 20 at the side of the steel member to be joined is roughened or otherwise processed for a high friction grip. When using a nut (washer) at the male thread 6s side as shown in FIG. 35(a), it is also possible to apply similar processing or bonding to the seat face of the nut (washer) so as to prevent rotation.

Further, by lubricating the seat face 6f of the bolt head 6t and the male thread 6s in advance or at the time of use, when applying a high tension to the Torque-Shear type high strength bolt 6α of the present invention, it is possible to prevent seizure with the nut screwed with the male thread 6s or the female thread of the steel member to being joined and thereby enable introduction of tension smoothly and stably. When using a nut, it is also possible to prevent co-rotation of the nut when not fixing the nut in place.

For example, when using the Torque-Shear type high strength bolt 6α of the present invention shown in FIG. 4(*a*) and FIG. 4(*b*) as a through bolt in a high strength bolted structure of a rectangular steel tube column and an H-section beam using split T-sections as joining hardware, as shown in FIG. 35(*a*), the high strength bolt 6α is inserted into the superposed bolt hole 1*a* of the rectangular steel tube column 1 and bolt hole 2*a* of the split T-section 2, the male thread 6*s* is screwed with the female thread 37*s* of the nut 37 secured in advance together with the washer 36 at the emerging side of the bolt hole 1*a* of the rectangular steel tube column 1, that is, the inside of the rectangular steel tube column, and the head 6*t* side of the high strength bolt 6α is rotated using a hand or power wrench (not shown) for the primary tightening.

After the primary tightening, the pintail 18 is gripped by the inner sleeve 21*i* of the tightening tool 21, the outer sleeve 21*o* is engaged with the outer circumference of the washer 20, and the pintail 18 is rotated by the inner sleeve 21*i* to rotate the outer sleeve 21*o*, whereby the breakneck 19 of the pintail 18 is broken at a certain breaking torque using the rotational torque of the washer 20 as a reaction force and thereby the tension introduced to the high strength bolt 6α can be easily controlled.

FIG. 35(*b*) shows the state after breaking the breakneck 19 and removing the pintail 18. The head 6*t* of the high strength bolt 6α and washer 20 are positioned at the outside of the split T-section 2. The projecting height ha from the outer surface of the split T-section 2 to the front end of the head 6*t* of the high strength bolt 6α, here the breaking plane of the breakneck 19, can be reduced to about 60% of the projecting height h from the surface of the inner side of the rectangular steel tube column 1 to the surface of the front end of the high strength bolt 6α.

Further, as shown in FIG. 36(*a*), for example, when using the Torque-Shear type high strength bolt 6α of the present invention as a tap bolt in a bolted structure of one steel member 11 and another steel member 12, this high strength bolt 6α is inserted into the superposed bolt hole 12*a* of the steel member 12, the front end of the male thread 6*s* is screwed with a female thread 11*s* of the steel member 11, and the high strength bolt 6α is rotated at the head 6*t* side using a hand or power wrench (not shown) for the primary tightening.

After the primary tightening, the pintail 18 is gripped by the inner sleeve 21*i* of the tightening tool 21, the outer sleeve 21*o* is engaged with the outer circumference of the washer 20, and the pintail 18 is rotated by the inner sleeve 21*i* to rotate the outer sleeve 21*o*, whereby the breakneck 19 of the pintail 18 is broken at a certain breaking torque using the rotational torque of the washer 20 as a reaction force and thereby the tension introduced to the high strength bolt 6α can be easily controlled. FIG. 36(*b*) shows the state after the breakneck 19 is broken and the pintail 18 is removed.

Note that in a join structure using the Torque-Shear type high strength bolt of the present invention, in practice a plurality of Torque-Shear type high strength bolts are used, but in the case of FIG. 35(*a*), FIG. 35(*b*), FIG. 36(*a*), and FIG. 36(*b*), for convenience, examples of a bolted structure focusing on one Torque-Shear type high strength bolt among them were shown.

The Torque-Shear type high strength bolt of the present invention, as explained above, enables easy control of the tension introduced to the bolt and can contribute to the realization of a stable bolted structure both when used as a through bolt and when used as a tap bolt.

Note that when using the Torque-Shear type high strength bolt of the present invention as a through bolt and using it for join locations between rectangular steel tube columns and split T-sections or narrow join locations where attachment of the nuts are difficult, the nuts may be secured in advance to the inner sides of the rectangular steel tube columns or join locations (inner side) of the narrow places and the bolts inserted from the outside and tightened at the bolt sides so as to enable easy control of the tension introduced to the bolts and thereby achieve a stable bolted structure.

Further, the Torque-Shear type high strength bolt can greatly lower the projecting height due to the bolt and nut at the outer side from the case of a conventional Torque-Shear type high strength bolt using a nut, ease the obstacles at the time of providing a fire-resistant covering or finishing work, and ease the drop in aesthetic appearance in the case of a naked frame.

The Torque-Shear type high strength bolt and joining method using the same of the present invention are not limited to the above embodiment. In the above, the Torque-Shear type high strength bolt of the present invention was explained mainly with reference to the case of use for a high strength bolted structure of a rectangular steel tube column as an example of a box section member and an H-section beam, but the invention is not limited to use for such a join structure. It may also be used in the case of use of various steel shapes other than H-section beams as the beams.

The conditions for forming the head of the bolt, the conditions for forming the pintail and breaking groove (breakneck), the conditions for forming the threads, the conditions for forming the washer at the head side, the conditions for forming the nut and the washer, the high friction grip processing locations and processing conditions, the lubricant processing locations and processing conditions, etc. may be changed in accordance with the objects to be joined, the joined locations, the material strength, design strength, etc.

INDUSTRIAL APPLICABILITY

The bolted structure of the present invention enables bolting by only high strength bolts, i.e., without using special expensive one-side bolts, in the bolting of a box section column and split T-section, so the following effects can be expected:

(1) A reduction of the construction cost of a column-beam join can be achieved.

(2) A column-beam join of a larger sized structure becomes possible by high strength bolting. As a result, joins which used to have to be made welded structures can be made by high strength bolts, so greater stability of the dynamic quality can be achieved, the work efficiency is good, and a structure with a high structural stability can be obtained.

(3) A Torque-Shear type high strength bolt enabling easy control of the tension introduced to the bolt in the case of tightening the bolt by rotating its head at the outside can be used and therefore a high strength, stable bolted structure can be realized.

Further, the Torque-Shear type high strength bolt according to the present invention can greatly lower the projecting height due to the bolt and nut at the outside surface of the structure, ease the obstacles at the time of providing a fire-resistant covering or finishing work, and ease the drop in aesthetic appearance in the case of a naked frame in a bolted structure using this as through bolts.

Further, for example, in a high strength bolted structure between a rectangular steel tube column and H-section beam which uses a rectangular steel tube as an example of a box section member as a column and attaches an H-section beam through joining hardware or at join locations where tightening of a nut is difficult, when tightening the nut to the inner side in advance and rotating the head side of the bolt at the outside for tightening and even when using this as a tap bolt not using a nut, the tension introduced to the bolt can be easily controlled and a stable, high strength bolted structure can be realized.

The invention claimed is:

1. A high strength bolted structure comprising:
a box section member and an adjacent joining hardware with each having multiple aligned bolt holes for a high strength bolted connection;
at least at one of said multiple aligned bolt holes of said box section member and adjacent joining hardware:
a nut having a sleeve fixed to said nut and having a female thread abuts against an inner side of said box section member adjacent said bolt hole, with said sleeve of said nut inserted into said adjacent bolt hole of said box section member;
a nut holding part having a flange and a sleeve, with said sleeve of said nut holding part inserted into said bolt hole of said box section member adjacent said nut from an outer side of said box section member, with said flange of said nut holding part abutting said outer side of said box section member, and with said sleeve of said nut holding part engaged with said sleeve of said nut, whereby said nut is secured to said inner side of said box section member;
a high strength bolt having a nut head and a male thread, said high strength bolt inserted through aligned bolt holes of said box section member and adjacent joining hardware from an outer side of said adjacent joining hardware, with said nut head of said high strength bolt adjacent said outer side of said adjacent joining hardware and with said male thread of said high strength bolt screwed into said female thread of said nut, thereby providing said high strength bolted structure.

2. A high strength bolted structure comprising:
a box section member and an adjacent joining hardware with each having multiple aligned bolt holes for a high strength bolted connection;
at least at one of said multiple aligned bolt holes of said box section member and adjacent joining hardware:
a nut having a female thread and having a sleeve fixed to said nut, with said sleeve having a longitudinal direction and an outer diameter, wherein said sleeve has slits in the longitudinal direction providing a slit formed region of said sleeve, wherein said slit formed region of said sleeve is expandable and contractible elastically with respect to said outer diameter of said sleeve;
said slit formed region of said sleeve of said nut press-fitted into said bolt hole of said box section member from an inner side of said box section member, with said nut abutting said inner side of said box section member, whereby said nut is secured to said inner side of said box section member;
a high strength bolt having a nut head and a male thread, said high strength bolt inserted through aligned bolt holes of said box section member and adjacent joining hardware from an outer side of said adjacent joining hardware, with said nut head of said high strength bolt adjacent said outer side of said adjacent joining hardware and with said male thread of said high strength bolt screwed into said female thread of said nut, thereby providing said high strength bolted connection.

3. A high strength bolted structure comprising:
a box section member and an adjacent joining hardware with each having multiple aligned bolt holes for a high strength bolted connection;
at least at one of said multiple aligned bolt holes of said box section member and adjacent joining hardware:
a nut having a female thread and a sleeve fixed to said nut, with said sleeve having engagement projections at its front end;
said sleeve inserted into said bolt hole of said box section member from an inner side of said box section member, with said nut abutting said inner side of said box section member and said engagement projections of said sleeve projecting to an outer side of said box section member, and said engagement projections of said sleeve bent outward into contact with said outer side of said box section member, whereby said nut is secured to said inner side of said box section member;
a high strength bolt having a nut head and a male thread, said high strength bolt inserted through aligned bolt holes of said box section member and adjacent joining hardware from an outer side of said adjacent joining hardware, with said nut head of said high strength bolt adjacent said outer side of said adjacent joining hardware and with said male thread of said high strength bolt screwed into said female thread of said nut, thereby providing said high strength bolted connection.

4. A high strength bolted structure comprising:
a box section member and adjacent joining hardware with each having multiple aligned bolt holes for a high strength bolted connection;
at least at one of said multiple aligned bolt holes of said box section member and adjacent hardware:
a nut having an outer circumference and a female thread, with said nut abutting against an inner side of said box section member adjacent said bolt hole;
a nut holding part including a sleeve, with said sleeve of said nut holding part having one end and an opposite second end;
engagement tabs located at said one end of said sleeve of said nut holding part with said engagement tabs engaging said outer circumference of said nut;
engagement projections located at said second end of said sleeve of said nut holding part, with said sleeve of said nut holding part inserted into said bolt hole of said box section member adjacent said nut from an inner side of said box section member, with said nut abutting said inner side of said box section member, and said engagement projections of said sleeve projecting to an outer side of said box section member and said engagement projections of said sleeve bent outward into contact with said outer side of said box section member, whereby said nut is secured to said inner side of said box section member;
a high strength bolt having a nut head and a male thread, said high strength bolt inserted through aligned bolt holes of said box section member and adjacent joining hardware from an outer side of said adjacent joining hardware, with said nut head of said high strength bolt adjacent said outer side of said adjacent joining hardware and with said male thread of said high strength bolt screwed into said female thread of said nut, thereby providing said high strength bolted connection.

5. A high strength bolted structure comprising:
a box section member and adjacent joining hardware with each having multiple aligned bolt holes for a high strength bolted connection;
at least at one of said multiple aligned bolt holes of said box section member and adjacent joining hardware:
a nut having a female thread abutting against an inner side of said box section member adjacent said bolt hole, with said nut having an engagement rim providing an engagement hole located adjacent said inner side of said box section member;
a nut holding part having a sleeve with a first end and an opposite second end, with an engagement hook located at said first end of said sleeve of said nut holding part and a flange located at said second end of said sleeve of said nut holding part, with said nut holding part inserted into said bolt hole of said box section member adjacent said nut from an outer side of said box section member, with said engagement hook of said nut holding part engaging said engagement hole of said engagement rim of said nut, and said flange of said nut holding part abutting said outer side of said box section member, whereby said nut is secured to said inner side of said box section member;
a high strength bolt having a nut head and a male thread, said high strength bolt inserted through aligned bolt holes of said box section member and adjacent joining hardware from an outer side of said adjacent joining hardware, with said nut head of said high strength bolt adjacent said outer side of said adjacent joining hardware and with said male thread of said high strength bolt screwed into said female thread of said nut, thereby providing said high strength bolted connection.

6. A high strength bolted structure of a box section member and adjacent joining hardware as set forth in any one of claims 1 to 5, wherein said high strength bolt has a torque control mechanism located at said nut head of said high strength bolt and said nut head of said high strength bolt has a nut head seat face and a washer is located abutting between said nut head seat face and said outer side of said adjacent joining hardware.

7. A method of securing a nut to an inner side of a box section member comprising:
providing said box section member with multiple bolt holes for a high strength bolted connection;
at least at one of said multiple bolt holes of said box section member:
providing a nut with a female thread at an inner side of said box section member;
providing a nut setting bolt at said inner side of said box section member, with said nut setting bolt having one end and a second opposite end, with a male thread located at said one end of said nut setting bolt, with said male thread of said nut setting bolt screwed into said female thread of said nut;
inserting said second end of said nut setting bolt into said bolt hole of said box section member from said inner side of said box section member and projecting said second end of said nut setting bolt outside an outer side of said box section member;
securing said nut to said inner side of said box section member by inserting a nut holding part over said nut setting bolt from said outer side of said box section member.

8. A method of securing a nut to an inner side of a box section member comprising:
providing said box section member with multiple bolt holes for a high strength bolted connection;
at least at one of said multiple bolt holes of said box section member:
providing a nut with a female thread at an inner side of said box section member;
providing a nut setting bolt at said inner side of said box section member, with said nut setting bolt having one end and a second opposite end, with a male thread located at said one end of said nut setting bolt, with said male thread of said nut setting bolt screwed into said female thread of said nut;
inserting said second end of said nut setting bolt into said bolt hole of said box section member from said inner side of said box section member and projecting said second end of said nut setting bolt outside an outer side of said box section member; securing said nut to said inner side of said box section member by bonding.

9. A method for securing a nut to an inner side of a box section member as set forth in claim 7 or 8 further comprising:
after securing said nut to said inner side of said box section member, rotating said nut setting bolt to detach said nut setting bolt from said nut.

10. A method for securing a nut to an inner side of a box section member as set forth in claim 7 or 8 further comprising:
after securing said nut to said inner side of said box section member, screwing and tightening a temporary nut to said nut setting bolt from said outer side of said box section member to temporarily hold said nut setting bolt.

* * * * *